US012562446B2

(12) United States Patent
Taneda et al.

(10) Patent No.: US 12,562,446 B2
(45) Date of Patent: Feb. 24, 2026

(54) WAVEGUIDE SUBSTRATE AND METHOD OF MAKING WAVEGUIDE SUBSTRATE

(71) Applicant: SHINKO ELECTRIC INDUSTRIES CO., LTD., Nagano (JP)

(72) Inventors: Hiroshi Taneda, Nagano (JP); Yoko Nakabayashi, Nagano (JP); Noriyoshi Shimizu, Nagano (JP); Noritaka Katagiri, Nagano (JP); Tatsuki Sumi, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 132 days.

(21) Appl. No.: 18/436,391

(22) Filed: Feb. 8, 2024

(65) Prior Publication Data

US 2024/0283121 A1 Aug. 22, 2024

(30) Foreign Application Priority Data

Feb. 17, 2023 (JP) ................................ 2023-023619

(51) Int. Cl.
*H01P 3/12* (2006.01)
*H01P 11/00* (2006.01)

(52) U.S. Cl.
CPC ............ *H01P 3/121* (2013.01); *H01P 11/002* (2013.01)

(58) Field of Classification Search
CPC ........ H01P 3/121; H01P 11/002; H01P 5/107; H01P 3/16; H01P 5/087; H01P 1/2088; H01P 3/12; H01P 11/001; H01P 1/2002; H01P 3/08; H01P 5/08; H01P 5/12; H01P 3/081; H01P 1/207; H01P 3/123; H01P 5/024; H01P 5/02; H01P 5/184; H01P 3/003; H01P 1/2005; H01P 3/165; H01P 5/00; H01P 11/003; H01P 5/028; H01P 3/00; H01P 7/10; H01P 1/208; H01P 11/007; H01P 5/103; H01P 1/20; H01P 3/082; H01P 11/00; H01P 3/06;
(Continued)

(56) References Cited

U.S. PATENT DOCUMENTS

| | | | | |
|---|---|---|---|---|
| 2004/0041663 A1* | 3/2004 | Uchimura | H01P 1/2088 | 333/135 |
| 2007/0262828 A1* | 11/2007 | Fujita | H01P 5/107 | 333/248 |
| 2010/0141350 A1* | 6/2010 | Sasaki | H01P 3/121 | 333/1.1 |

FOREIGN PATENT DOCUMENTS

JP 2008-124124 5/2008

* cited by examiner

*Primary Examiner* — John W Poos
(74) *Attorney, Agent, or Firm* — IPUSA, PLLC

(57) ABSTRACT

A waveguide substrate includes a core substrate through which first through holes and second through holes are formed, a first conductive layer covering an inner wall of the first through holes and both sides of the core substrate, a second conductive layer covering an inner wall of the second through holes and both sides of the core substrate, a first filler material filling a space surrounded by the first conductive layer inside the first through holes, a second filler material filling a space surrounded by the second conductive layer inside the second through holes, and third conductive layers disposed on respective sides of the core substrate, the third conductive layers overlapping the first and second through holes in a plan view, and the third conductive layers being electrically connected to the first and second conductive layers, wherein the second conductive layer overlaps the first through holes in the plan view.

7 Claims, 19 Drawing Sheets

(58) Field of Classification Search
CPC .......... H01P 3/122; H01P 1/042; H01P 3/085; H01P 5/082; H01P 1/047; H01P 1/30; H01P 3/18; H01P 7/065; H01P 5/10; H01P 3/026; H01P 5/085; H01P 1/2138; H01P 3/088; H01P 5/18; H01P 1/04; H01P 5/022; H01P 1/2084; H01P 1/211; H01P 1/2053; H01P 1/222; H01P 11/006; H01P 5/182; H01P 7/06; H01P 1/203; H01P 5/16; H01P 5/181; H01P 1/20345; H01P 3/14; H01P 5/1007; H01P 1/184; H01P 1/213; H01P 1/36; H01P 3/10; H01P 5/1022; H01P 1/181; H01P 1/2135; H01P 1/268; H01P 1/383; H01P 3/006; H01P 5/183; H01P 7/082; H01P 1/02; H01P 1/127; H01P 1/16; H01P 1/18; H01P 1/182; H01P 1/20327; H01P 1/2082; H01P 1/212; H01P 1/2133; H01P 1/264; H01P 1/387; H01P 3/02; H01P 5/188; H01P 5/20; H01P 7/04; H01P 7/08; H01P 1/10; H01P 1/15; H01P 1/161; H01P 1/201; H01P 1/2039; H01P 1/2086; H01P 1/38; H01P 11/008; H01P 3/084; H01P 5/227; H01P 7/105; H01P 1/122; H01P 1/162; H01P 1/172; H01P 1/173; H01P 1/19; H01P 1/2007; H01P 1/20336; H01P 1/20363; H01P 1/209; H01P 1/2136; H01P 1/219; H01P 1/227; H01P 11/005; H01P 3/087; H01P 3/127; H01P 3/20; H01P 5/04; H01P 5/1015; H01P 5/187; H01P 5/222; H01P 1/00; H01P 1/06; H01P 1/12; H01P 1/2013; H01P 1/20309; H01P 1/22; H01P 1/262; H01P 3/023; H01P 5/026

See application file for complete search history.

WAVEGUIDE SUBSTRATE AND METHOD OF MAKING WAVEGUIDE SUBSTRATE

CROSS-REFERENCE TO RELATED APPLICATIONS

The present application is based upon and claims the benefit of priority from the prior Japanese Patent Application No. 2023-023619 filed on Feb. 17, 2023, with the Japanese Patent Office, the entire contents of which are incorporated herein by reference.

FIELD

The disclosures herein relate to waveguide substrates and methods of making a waveguide substrate.

BACKGROUND

Some waveguide substrates as known in the art include a post-wall waveguide having parallel plates. In such a waveguide substrate, through holes formed through the substrate are densely arrayed, and a conductive layer is provided on the inner wall surface of each through hole.

When the noted waveguide substrate is manufactured by forming through holes in the substrate, the strength of the substrate is significantly reduced, which creates the risk that subsequent processing such as the forming of conductive layer by plating or the like becomes difficult.

Accordingly, it may be desired to provide a waveguide substrate and a method of manufacturing a waveguide substrate for which a decrease in the strength of the substrate is reduced.

PRIOR ART DOCUMENT

Patent Document

[Patent Document 1] Japanese Laid-Open Patent Publication No. 2008-124124

SUMMARY

According to an aspect of the embodiment, a waveguide substrate includes a core substrate through which first through holes and second through holes are formed, a first conductive layer covering an inner wall surface of each of the first through holes and covering both sides of the core substrate, a second conductive layer covering an inner wall surface of each of the second through holes and covering both sides of the core substrate, a first filler material filling a space surrounded by the first conductive layer inside each of the first through holes, a second filler material filling a space surrounded by the second conductive layer inside each of the second through holes, and third conductive layers disposed on respective sides of the core substrate, the third conductive layers overlapping the first through holes and the second through holes in a plan view, and the third conductive layers being electrically connected to both the first conductive layer and the second conductive layer, wherein the second conductive layer overlaps the first through holes in the plan view.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
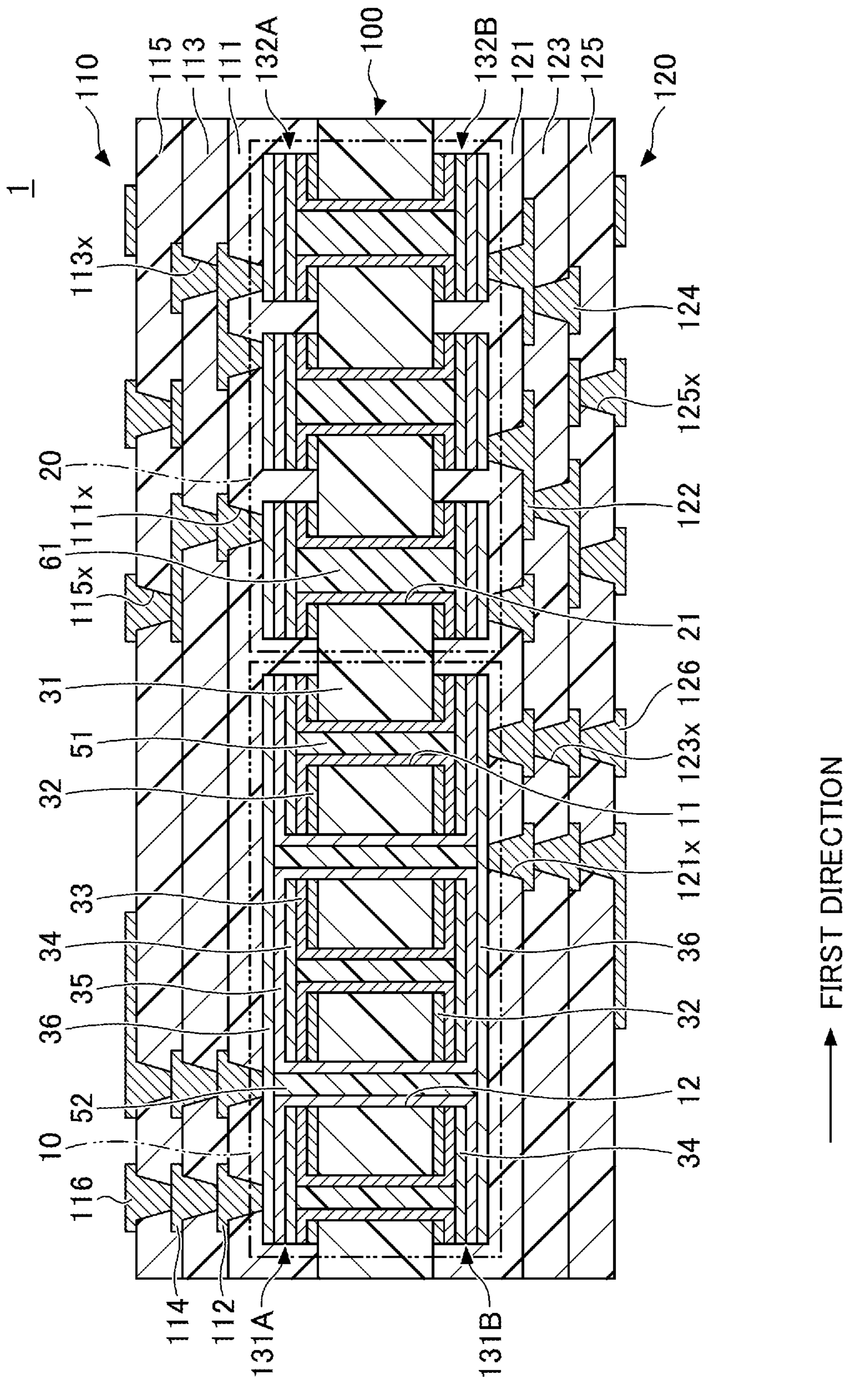
FIG. 1 is a cross-sectional view illustrating an example of a waveguide substrate according to a first embodiment.

In the following, embodiments will be described in detail with reference to the accompanying drawings. In the specification and the drawings, elements having substantially the same functional configuration are referred to by the same reference numerals, and a duplicate description thereof may be omitted.

First Embodiment

There will be a description of a first embodiment. The first embodiment relates to a waveguide substrate including a waveguide for use in transmission and reception of radio waves. The frequencies of radio waves are, for example, 100 GHz to 150 GHz, but are not limited thereto.

[Structure of Waveguide Substrate]

Figure 2:
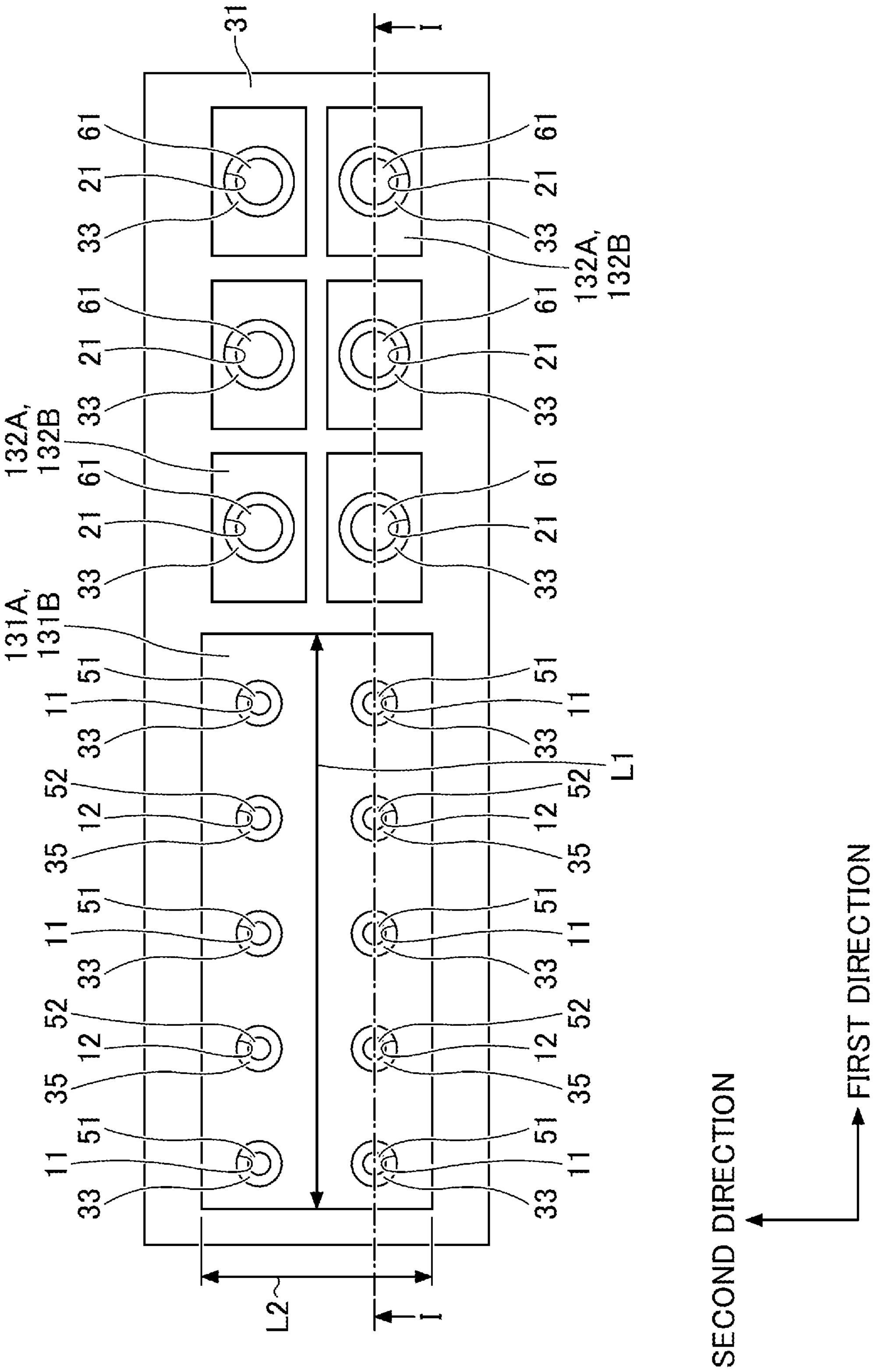
FIG. 2 is a schematic view illustrating an example of the arrangement of through holes in the waveguide substrate according to the first embodiment.

There will first be a description of the structure of a waveguide substrate. FIG. 1 is a cross-sectional view illustrating an example of a waveguide substrate according to the first embodiment. FIG. 2 is a schematic view illustrating an example of the arrangement of through holes in the waveguide substrate according to the first embodiment. FIG. 1 corresponds to a cross-sectional view taken along the line I-I in FIG. 2.

As illustrated in FIG. 1, the waveguide substrate 1 according to the first embodiment includes a core interconnect substrate 100, a build-up layer structure 110, and a build-up layer structure 120. The core interconnect substrate 100 is positioned between the build-up layer structure 110 and the build-up layer structure 120.

In the present embodiment, for the sake of convenience, the same side of the waveguide substrate 1 as the build-up layer structure 110 is referred to as an upper side or a first side, and the same side thereof as the build-up layer structure 120 is referred to as a lower side or a second side. The surface of an element on the upper side is referred to as an upper surface or a first surface, and the surface of an element on the lower side is referred to as a lower surface or a second surface. However, the waveguide substrate 1 may be used upside down or may be arranged at any angle. In addition, a plan view refers to a view of an object as seen in the normal direction of the upper surface of the build-up layer structure 110, and a plane shape refers to the shape of an object as viewed in the normal direction of the upper surface of the build-up layer structure 110.

<Core Interconnect Substrate 100>

There will be a description of the core interconnect substrate 100. The core interconnect substrate 100 includes a first region 10 and a second region 20 defined in a plan view. The first region 10 includes a post-wall waveguide with posts connecting upper and lower parallel plates. The second region 20 is mainly used as signal paths between the build-up layer structure 110 and the build-up layer structure 120.

The core interconnect substrate 100 includes a core substrate 31, conductive layers 32, 33, 34, 35, and 36, and filler materials 51, 52, and 61.

The core substrate 31 is made of an insulating material such as glass epoxy resin or bismaleimide-triazine. The conductive layers 32 are formed on the respective upper and lower surfaces of the core substrate 31. The conductive layers 32, 33, 34, 35, and 36 are made of a metal such as copper. The conductive layer 32 may be a copper foil. The conductive layers 33, 34, 35, and 36 may be copper plating layers. The filler materials 51, 52, and 61 are made of an insulating material. The material of the filler materials 51, 52, and 61 may be, for example, an insulating resin (e.g., an epoxy-based resin) containing a filler material such as silica.

<First Region 10>

There will be a description of the first region 10. In the first region 10, a plurality of through holes 11 are formed through a laminate of the substrate 31 and the conductive layers 32 disposed on the respective upper and lower sides, and extends through the laminate in the thickness direction. As illustrated in FIGS. 1 and 2, the through holes 11 are arranged in rows along a first direction in a plan view. Two rows of the through holes 11 are arranged side by side in a second direction perpendicular to the first direction in the plan view. The plane shape of each through hole 11 is, for example, a circular shape having a diameter of 100 μm. The plane shape of the through hole 11 may alternatively be an elliptical shape, a rectangular shape, or the like. The through holes 11 are an example of first through holes.

In the first region 10, the conductive layer 33 covers the inner wall surface of each through hole 11, the upper surface of the conductive layer 32 situated on the upper side of the core substrate 31, and the lower surface of the conductive layer 32 situated on the lower side of the core substrate 31. The conductive layer 33 is in direct contact with the inner wall surface of the through hole 11, the upper surface of the conductive layer 32 disposed on the upper side of the core substrate 31, and the lower surface of the conductive layer 32 disposed on the lower side of the core substrate 31. The conductive layer 33 in the first region 10 is an example of a first conductive layer.

The filler material 51 is provided in a space surrounded by the conductive layer 33 inside each through hole 11, and fills the space inside the through hole 11. The upper surface of the filler material 51 is flush with the upper surface of the conductive layer 33, and the lower surface of the filler material 51 is flush with the lower surface of the conductive layer 33. The filler material 51 is an example of a first filler material.

In the first region 10, the conductive layers 34 are provided on the respective upper and lower sides of the core substrate 31. The upper conductive layer 34 disposed over the core substrate 31 covers the upper surface of the conductive layer 33 and the upper surface of the filler material 51. The lower conductive layer 34 disposed under the core substrate 31 covers the lower surface of the conductive layer 33 and the lower surface of the filler material 51.

A plurality of through holes 12 are formed in a laminate of the core substrate 31, the conductive layers 32 disposed on the respective upper and lower sides, the conductive layer 33, and the conductive layers 34 disposed on the respective upper and lower sides, and extend through the laminate in the thickness direction. As illustrated in FIGS. 1 and 2, each through hole 12 is disposed between the through holes 11 adjacent to each other in the first direction. The through holes 11 and 12 alternately arranged in the first direction form two rows arranged side by side in the second direction. The plane shape of each through hole 12 is, for example, a circular shape having a diameter of 100 μm. The plane shape of the through hole 12 may be an elliptical shape, a rectangular shape, or the like. The through holes 12 are an example of second through holes.

The distance between a given through hole 11 and each of the through holes 12 adjacent thereto in the first direction is, for example, 150 μm or less.

In the first region 10, the conductive layer 35 covers the inner wall surface of each through hole 12, the upper surface of the conductive layer 34 situated on the upper side of the core substrate 31, and the lower surface of the conductive layer 34 situated on the lower side of the core substrate 31. The conductive layer 35 is in direct contact with the inner wall surface of the through hole 12, the upper surface of the conductive layer 34 disposed on the upper side of the core substrate 31, and the lower surface of the conductive layer 34 disposed on the lower side of the core substrate 31. The conductive layer 35 in the first region 10 is an example of a second conductive layer.

The filler material 52 is provided in a space surrounded by the conductive layer 35 inside each through hole 12, and fills the space inside the through hole 12. The upper surface of the filler material 52 is flush with the upper surface of the conductive layer 35, and the lower surface of the filler material 52 is flush with the lower surface of the conductive layer 35. The filler material 52 is an example of a second filler material.

In the first region 10, the conductive layers 36 are provided on the respective upper and lower sides of the core substrate 31. The upper conductive layer 36 disposed over the core substrate 31 covers the upper surface of the conductive layer 35 and the upper surface of the filler material 52. The lower conductive layer 36 disposed under the core substrate 31 covers the lower surface of the conductive layer 35 and the lower surface of the filler material 52. The conductive layers 36 in the first region 10 are an example of third conductive layers.

In the first region 10, a conductive layer 131A having a flat plate shape is formed as a laminate of the conductive layers 32, 33, 34, 35, and 36 on the upper side of the core substrate 31, and a conductive layer 131B having a flat plate shape is formed as a laminate of the conductive layers 32, 33, 34, 35, and 36 on the lower side of the core substrate 31. The conductive layers 131A and 131B have identical shapes, and exactly overlap, in a plan view. The conductive layers 131A and 131B are electrically connected to each other via the conductive layer 33 in the through holes 11 and the conductive layer 35 in the through holes 12, which are arranged in two rows. The conductive layer 131A, the conductive layer 131B, the conductive layers 33 and 35 in one row of the through holes 11 and 12, and the conductive layers 33 and 35 in the other row of the through holes 11 and 12 constitute a waveguide that simulates a rectangular waveguide. The plane shape of each of the conductive layers 131A and 131B is a rectangular shape having a long side with a length L1 (i.e., the extent thereof in the first direction) of 120 mm and a short side with a length L2 (i.e., the extent thereof in the second direction) of 0.8 mm. The thicknesses of the thickest portions of the conductive layers 131A and 131B are each 0.01 mm to 0.1 mm. Alternatively, the thicknesses of the thickest portions of the conductive layers 131A and 131B may each be 0.015 mm to 0.025 mm.

<Second Region 20>

There will be a description of the second region 20. In the second region 20, a plurality of through holes 21 are formed in the laminate of the core substrate 31 and the conductive layers 32 disposed on the respective upper and lower sides, and extend through the laminate in the thickness direction. The plane shape of each through hole 21 is a circular shape having a diameter of 200 μm to 500 μm.

In the second region 20, the conductive layer 33 covers the inner wall surface of each through hole 21, the upper surface of the conductive layer 32 disposed on the upper side of the core substrate 31, and the lower surface of the conductive layer 32 disposed on the lower side of the core substrate 31. The conductive layer 33 is in direct contact with the inner wall surface of the through hole 21, the upper surface of the conductive layer 32 situated on the upper side of the core substrate 31, and the lower surface of the conductive layer 32 situated on the lower side of the core substrate 31.

The filler material 61 is provided in a space surrounded by the conductive layer 33 inside each through hole 21, and fills the space inside the through hole 21. The upper surface of the filler material 61 is flush with the upper surface of the conductive layer 33, and the lower surface of the filler material 61 is flush with the lower surface of the conductive layer 33.

In the second region 20, the conductive layers 34 are provided on the respective upper and lower sides of the core substrate 31. The upper conductive layer 34 situated over the core substrate 31 covers the upper surface of the conductive layer 33 and the upper surface of the filler material 61. The lower conductive layer 34 situated under the core substrate 31 covers the lower surface of the conductive layer 33 and the lower surface of filler material 61.

In the second region 20, the conductive layers 35 are provided on the respective upper and lower sides of the core substrate 31. The upper conductive layer 35 disposed over the core substrate 31 covers the upper surface of the conductive layer 34. The lower conductive layer 35 disposed under the core substrate 31 covers the lower surface of the conductive layer 34.

In the second region 20, the conductive layers 36 are provided on the respective upper and lower sides of the core substrate 31. The upper conductive layer 36 located over the core substrate 31 covers the upper surface of the conductive layer 35. The lower conductive layer 36 located under the core substrate 31 covers the lower surface of the conductive layer 35.

In the second region 20, a conductive layer 132A having a flat plate shape is formed as a laminate of the conductive layers 32, 33, 34, 35, and 36 on the upper side of the core substrate 31, and a conductive layer 132B having a flat plate shape is formed as a laminate of the conductive layers 32, 33, 34, 35, and 36 on the lower side of the core substrate 31. Separate sets of conductive layers, each of which includes the conductive layers 132A and 132B, are provided in the second region 20. The conductive layers 132A and 132B in each set are electrically connected to each other via the conductive layer 33 in one through hole 21.

<Build-up Layer Structures 110 and 120>

The build-up layer structures 110 and 120 will be described. The build-up layer structure 110 includes insulating layers 111, 113, and 115 and interconnect layers 112, 114, and 116. The build-up layer structure 120 includes insulating layers 121, 123, and 125 and interconnect layers 122, 124, and 126.

On the upper side of the core interconnect substrate 100, the insulating layer 111 is formed on the core interconnect substrate 100. The insulating layer 111 covers the upper surface of the core interconnect substrate 100. Via holes 111*x* are formed in the insulating layer 111 to reach the contact portions of the conductive layer 36. The interconnect layer 112 connected to the conductive layer 36 through the via conductors in the via holes 111*x* is formed on the insulating layer 111. The insulating layer 113 is formed on the insulating layer 111. Via holes 113*x* are formed in the insulating layer 113 to reach the contact portions of the interconnect layer 112. The interconnect layer 114 connected to the interconnect layer 112 through via conductors in the via holes 113*x* is formed on the insulating layer 113. The insulating layer 115 is formed on the insulating layer 113. Via holes 115*x* are formed in the insulating layer 115 to reach the contact portions of the interconnect layer 114. The interconnect layer 116 connected to the interconnect layer 114 through via conductors in the via holes 115*x* is formed on the insulating layer 115. The interconnect layer 116 is used as an external terminal, for example. A solder resist layer through which at least a portion of the interconnect layer 116 is exposed may be provided on the insulating layer 115.

On the lower side of the core interconnect substrate 100, the insulating layer 121 is formed immediately under the core interconnect substrate 100. The insulating layer 121 covers the lower surface of the core interconnect substrate 100. Via holes 121*x* are formed in the insulating layer 121 to reach the contact portions of the conductive layer 36. The interconnect layer 122 connected to the conductive layer 36 through the via conductors in the via holes 121*x* is formed immediately under the insulating layer 121. The insulating layer 123 is formed immediately under the insulating layer 121. Via holes 123*x* are formed in the insulating layer 123 to reach the contact portions of the interconnect layer 122. The interconnect layer 124 connected to the interconnect layer 122 through via conductors in the via holes 123*x* is formed immediately under the insulating layer 123. The insulating layer 125 is formed immediately under the insulating layer 123. Via holes 125*x* are formed in the insulating layer 125 to reach the contact portions of the interconnect layer 124. The interconnect layer 126 connected to the interconnect layer 124 through via conductors in the via holes 125*x* is formed immediately under the insulating layer 125. The interconnect layer 126 is used as an external terminal, for example. A solder resist layer through which at least a portion of the interconnect layer 126 is exposed may be provided immediately under the insulating layer 125.

[Method of Making Waveguide Substrate]

In the following, a method of making a waveguide substrate will be described. FIGS. 3A to 3C through FIGS. 6A and 6B are cross-sectional views illustrating an example of the method of making the waveguide substrate according to the first embodiment.

Figure 3A:
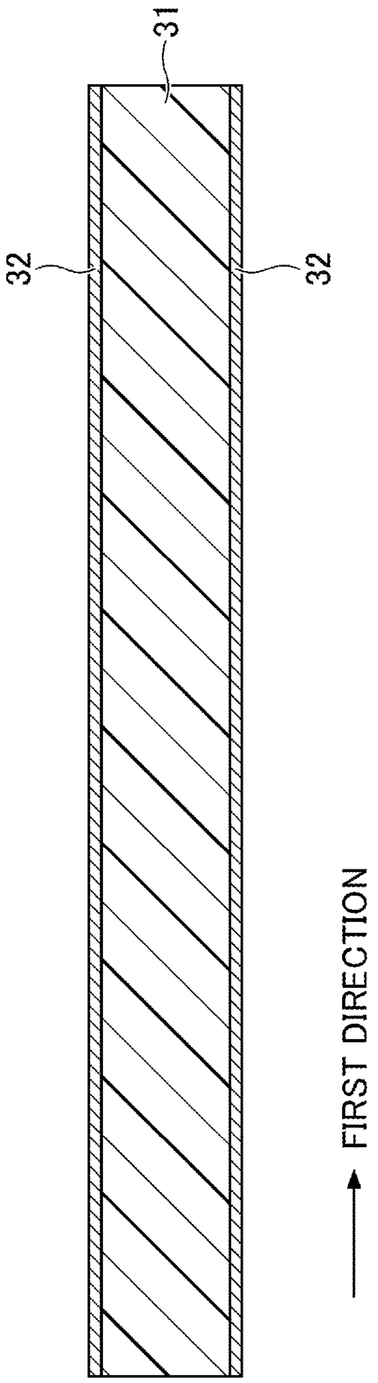
FIGS. 3A through 3C are cross-sectional views illustrating an example of a method of making the waveguide substrate according to the first embodiment.

As illustrated in FIG. 3A, a laminate of a core substrate 31 and conductive layers 32 disposed on the respective upper and lower sides thereof is prepared. A copper-clad laminate, for example, may be used as the laminate of the core substrate 31 and the conductive layers 32 situated on the respective upper and lower sides thereof.

Figure 3B:
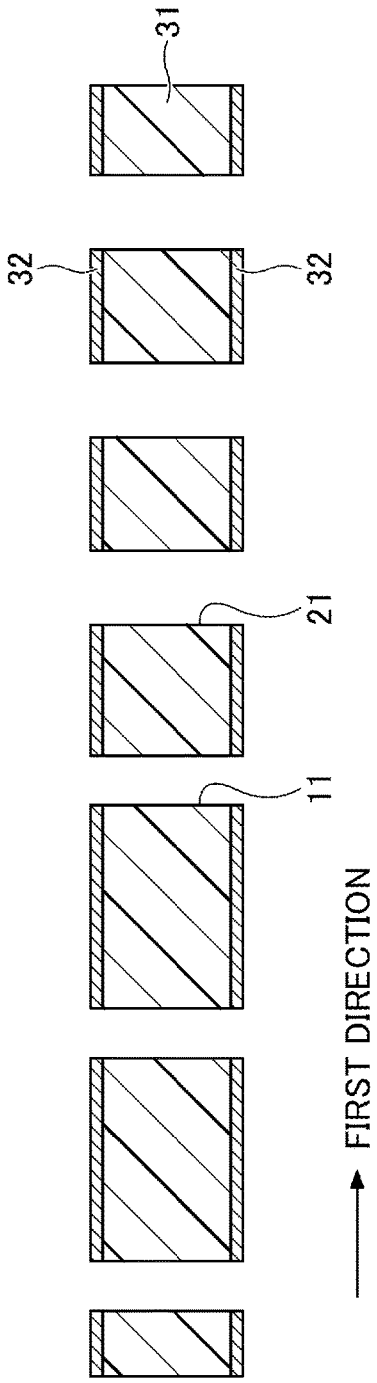

As illustrated in FIG. 3B, through holes 11 and 21 are formed in the laminate of the core substrate 31 and the conductive layers 32 disposed on the respective upper and lower sides. The through holes 11 and 21 may be formed by using a drill, laser, or the like.

Figure 3C:
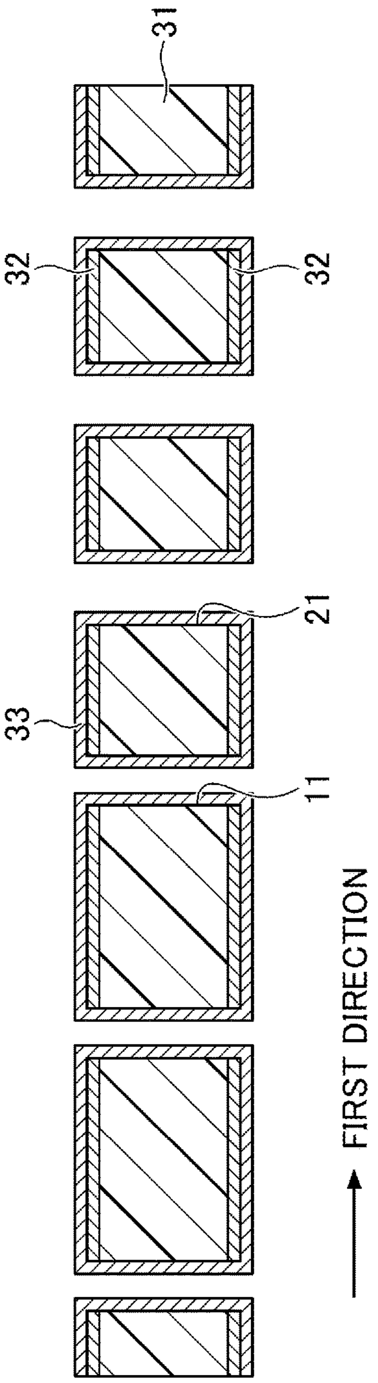

Thereafter, the surfaces of the conductive layers 32 and the inner wall surfaces of the through holes 11 and 21 are subjected to a desmear treatment. As illustrated in FIG. 3C, then, a conductive layer 33 is formed on the surfaces of the conductive layers 32 and the inner wall surfaces of the through holes 11 and 21. The conductive layer 33 may be, for example, a copper plating layer. In order to form the conductive layer 33, an electroless copper plating film may first be formed, and, then, an electrolytic copper plating film may be formed on the electroless copper plating film by an electrolytic plating method using the electroless copper plating film as a power feeding path for plating.

Figure 4A:
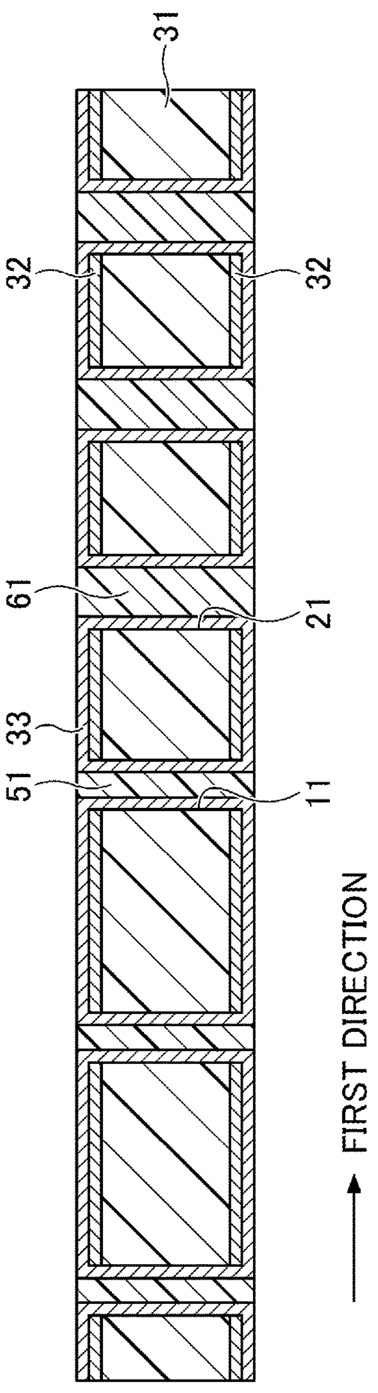
FIGS. 4A through 4C are cross-sectional views illustrating the example of the method of making the waveguide substrate according to the first embodiment.

Subsequently, as illustrated in FIG. 4A, the through holes 11 are filled with a filler material 51, and the through holes 21 are filled with a filler material 61. The filler materials 51 and 61 may be deposited by screen printing, for example. The filler material 51 is provided on the conductive layer 33 in the through holes 11, and the filler material 61 is provided on the conductive layer 33 in the through holes 21. The filler materials 51 and 61 are then cured, followed by removing the portions of the filler materials 51 and 61 protruding from the upper surface or the lower surface of the conductive layer 33. With this arrangement, the upper surfaces of the filler materials 51 and 61 become flush with the upper surface of the conductive layer 33, and the lower surfaces of the filler materials 51 and 61 become flush with the lower surface of the conductive layer 33. When the filler materials 51 and 61 include a thermo-setting material such as an epoxy resin, the filler materials 51 and 61 may be cured by heating. The protruding portions of the filler materials 51 and 61 may be removed by buffing or roll polishing, for example.

Figure 4B:
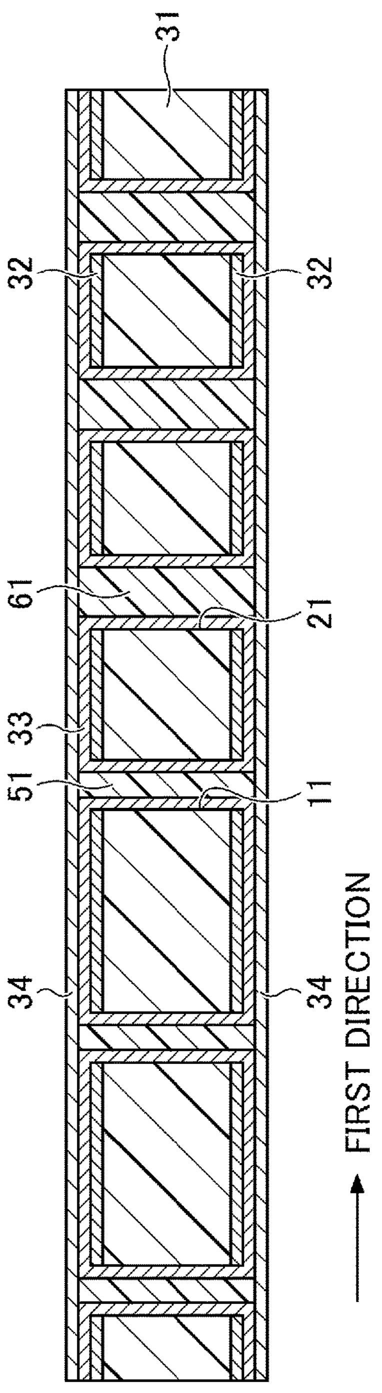

A desmear treatment is then performed on the surfaces of the conductive layer 33 and the surfaces of the filler materials 51 and 61. As illustrated in FIG. 4B, conductive layers 34 are formed on the surfaces of the conductive layer 33 and the surfaces of the filler materials 51 and 61. The conductive layers 34 may be, for example, a copper plating layer. In order to form the conductive layers 34, electroless copper plating films may be formed, and, then, electrolytic copper plating films may be formed on the respective electroless copper plating films by an electrolytic plating method using the electroless copper plating films as a power feeding path for plating.

Figure 4C:
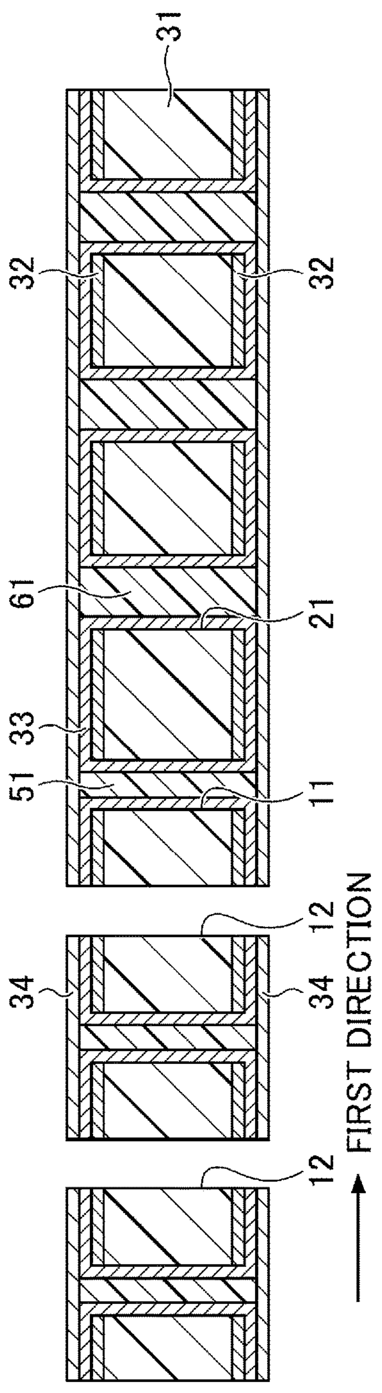

Subsequently, as illustrated in FIG. 4C, through holes 12 are formed through the laminate of the core substrate 31, the conductive layers 32 on the respective upper and lower sides, the conductive layer 33, and the conductive layers 34 on the respective upper and lower sides. For example, the through hole 12 may be formed by using a drill, laser, or the like.

Figure 5A:
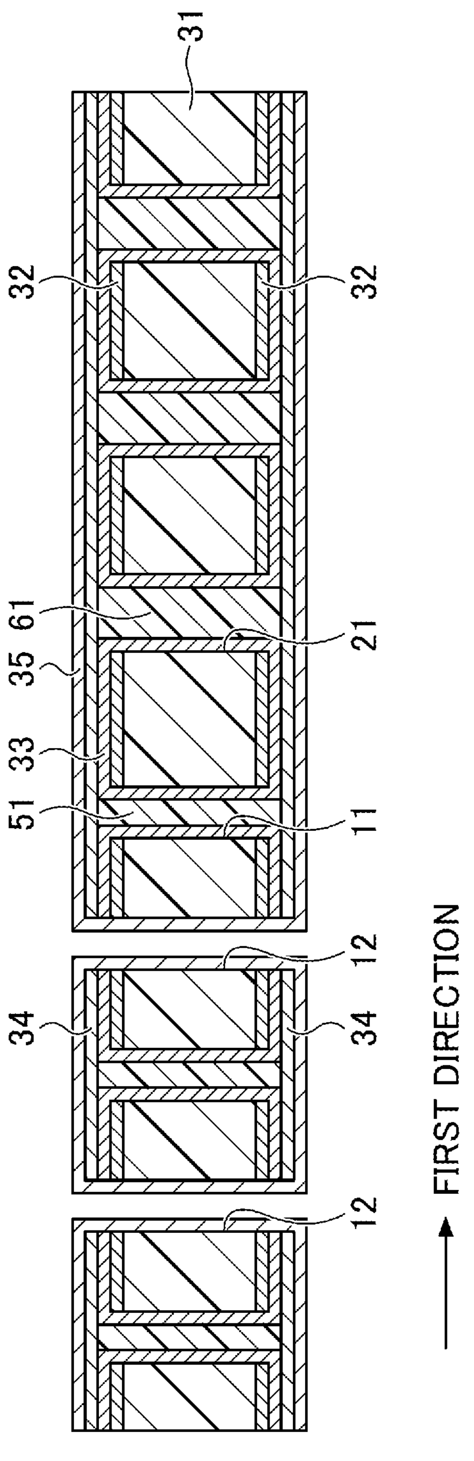
FIGS. 5A and 5B are cross-sectional views illustrating the example of the method of making the waveguide substrate according to the first embodiment.

A desmear treatment is then performed on the surfaces of the conductive layers 34 and the inner wall surfaces of the through holes 12. As illustrated in FIG. 5A, a conductive layer 35 is formed on the surfaces of the conductive layers 34 and the inner wall surfaces of the through holes 12. The conductive layer 35 may be, for example, a copper plating layer. In order to form the conductive layer 35, an electroless copper plating film may be formed, and, then, an electrolytic copper plating film may be formed on the electroless copper plating film by an electrolytic plating method using the electroless copper plating film as a power feeding path for plating.

Figure 5B:
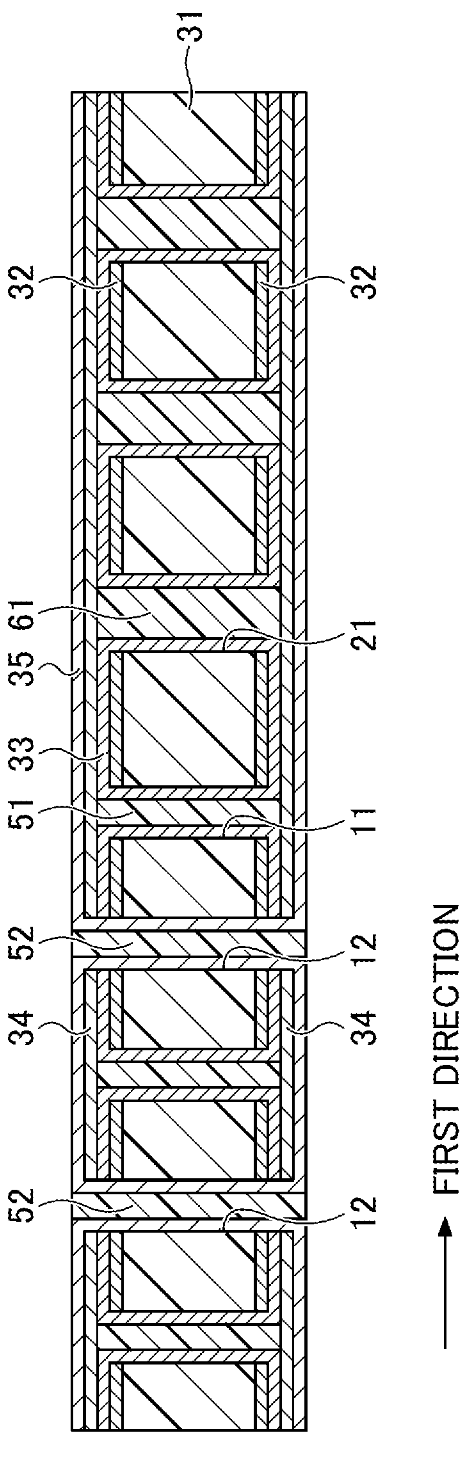

Thereafter, as illustrated in FIG. 5B, the through holes 12 are filled with a filler material 52. The filler material 52 may be disposed by screen printing, for example. The filler material 52 is provided on the conductive layer 35 in the through holes 12. The filler material 52 is then cured, followed by removing the portions of the filler material 52 protruding from the upper surface or the lower surface of the conductive layer 35. With this arrangement, the upper surface of the filler material 52 becomes flush with the upper surface of the conductive layer 35, and the lower surface of the filler material 52 becomes flush with the lower surface of the conductive layer 35. When the filler material 52 contains a thermo-setting material such as epoxy resin, the filler material 52 may be cured by heating. The protruding portions of the filler material 52 may be removed by buffing or roll polishing, for example.

Figure 6A:
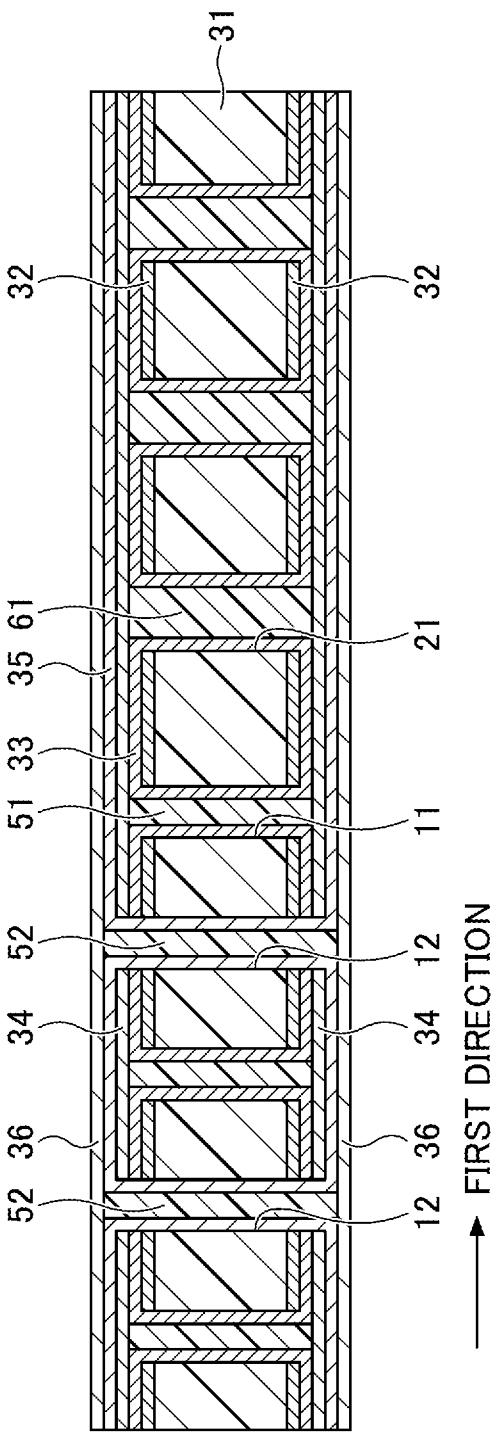
FIGS. 6A and 6B are cross-sectional views illustrating the example of the method of making the waveguide substrate according to the first embodiment.

A desmear treatment is thereafter performed on the surfaces of the conductive layer 35 and the surfaces of the filler material 52. Then, as illustrated in FIG. 6A, conductive layers 36 are formed on the surfaces of the conductive layer 35 and the surfaces of the filler material 52. The conductive layers 36 may be, for example, a copper plating layer. In order to form the conductive layers 36, electroless copper plating are formed, films and, then, electrolytic copper plating films are formed on the respective electroless copper plating films by an electrolytic plating method using the electroless copper plating films as a power feeding path for plating. Afterwards, polishing is performed.

Figure 6B:
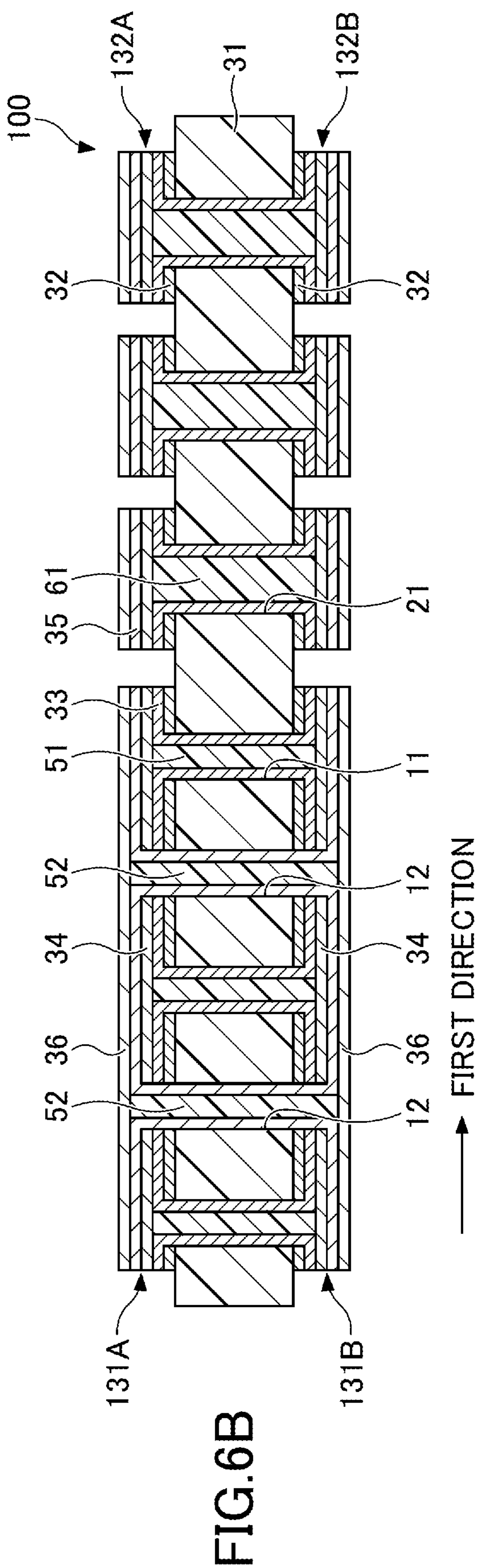

As illustrated in FIG. 6B, the conductive layers 36, 35, 34, 33, and 32 are patterned. For example, the conductive layers

36, 35, 34, 33, and 32 may be patterned by photolithography and etching. As a result, conductive layers 131A, 131B, 132A, and 132B are formed. That is, the conductive layers 131A, 131B, 132A, and 132B are formed from the conductive layers 36, 35, 34, 33, and 32 by the subtractive method.

The above description has detailed the making of the core interconnect substrate 100.

Subsequently, the build-up layer structures 110 and 120 are formed, thereby making the waveguide substrate 1 according to the first embodiment.

In the first embodiment, the through holes 12 are not present at the time when the through holes 11 are formed, and the conductive layer 33 and the filler material 51 are present in the through holes 11 at the time when the through holes 12 are formed. Because of this, even when the distance between the through hole 11 and the through hole 12 is short, the core substrate 31 has sufficiently high strength. That is, it is possible to avoid a decrease in the strength of the core substrate 31. This arrangement allows the conductive layer 33 to be stably formed after the formation of the through holes 11, and allows the conductive layer 35 to be stably formed after the formation of the through holes 12.

Second Embodiment

Figure 7:
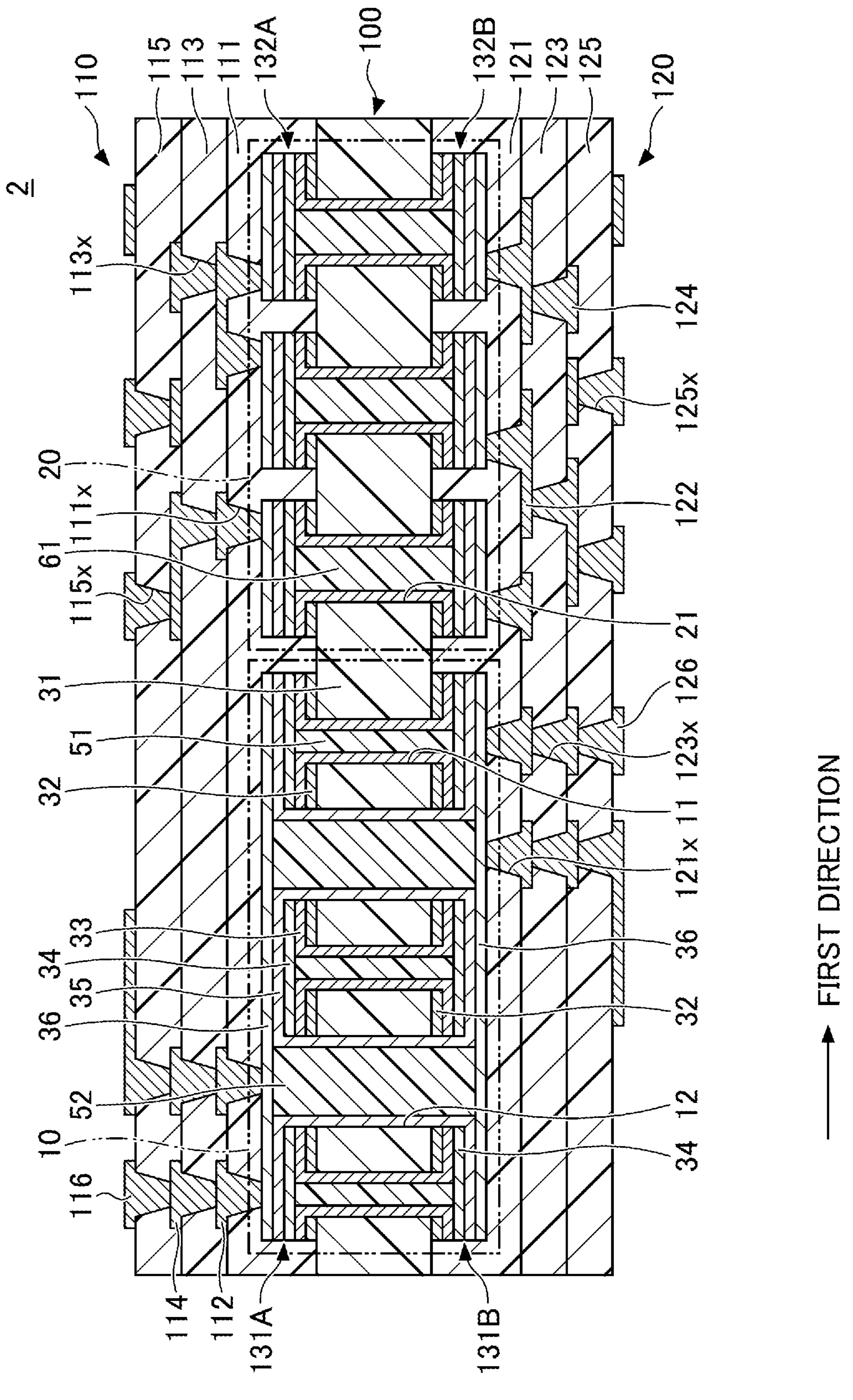
FIG. 7 is a cross-sectional view illustrating an example of a waveguide substrate according to a second embodiment.
Figure 8:
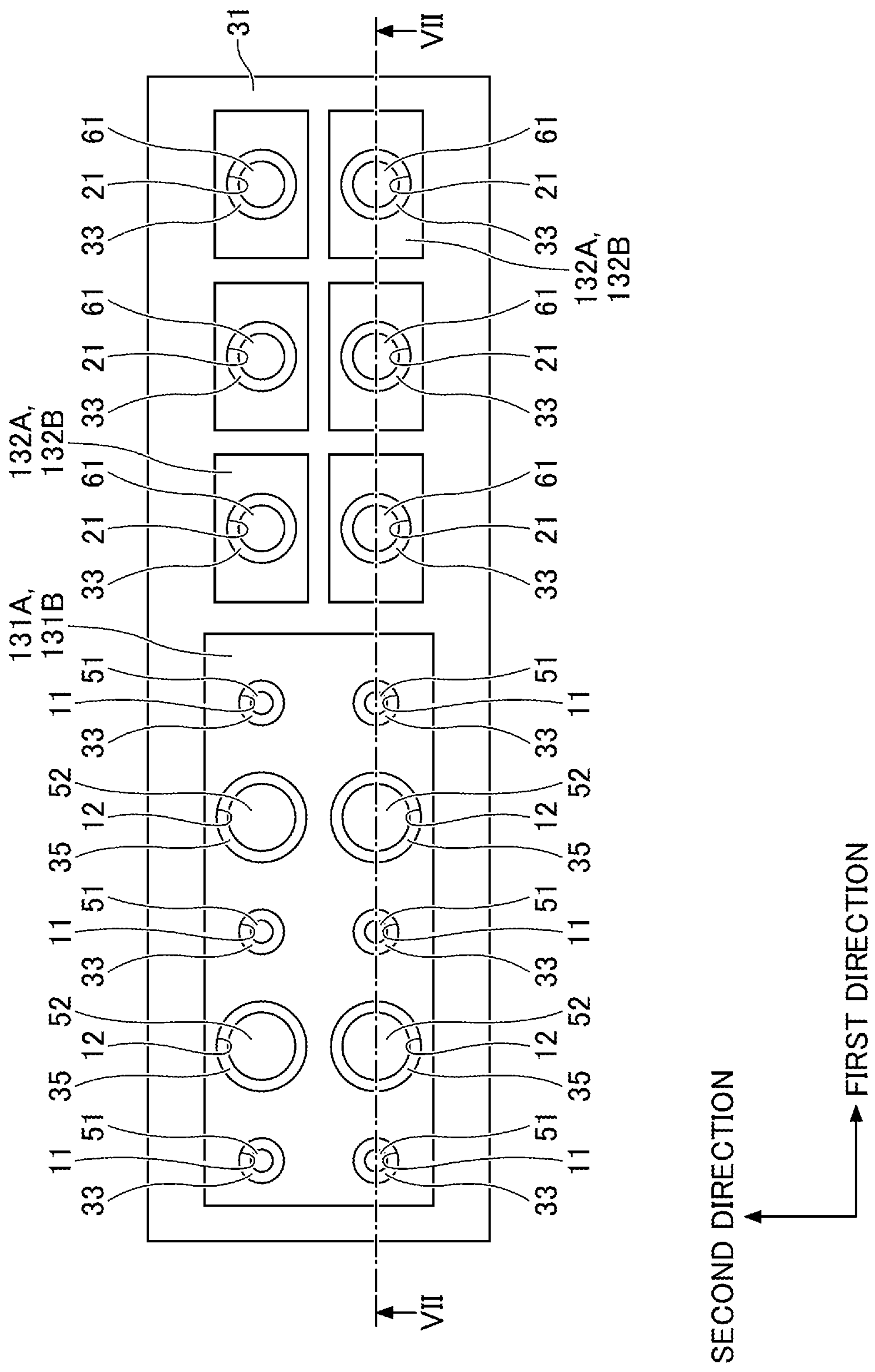
FIG. 8 is a schematic view illustrating an example of the arrangement of through holes in the waveguide substrate according to the second embodiment.

There will be a description of a second embodiment. The second embodiment differs from the first embodiment mainly in the size of the through holes 12. FIG. 7 is a cross-sectional view illustrating an example of a waveguide substrate according to the second embodiment. FIG. 8 is a schematic view illustrating an example of the arrangement of through holes in the waveguide substrate according to the second embodiment. FIG. 7 corresponds to a view of a cross-section taken along the line VII-VII in FIG. 8.

As illustrated in FIGS. 7 and 8, a waveguide substrate 2 according to the second embodiment is configured such that the width of each of the through holes 12 is larger than the width of each of the through holes 11. For example, the diameter of each of the through holes 12 is larger than the diameter of each of the through holes 11. The plane shape of each of the through holes 12 is, for example, a circular shape having a diameter of 150 μm. The plane shape of each of the through holes 12 may alternatively be an elliptical shape, a rectangular shape, or the like.

The remaining configurations are substantially the same as those of the first embodiment.

In order to make the waveguide substrate 2 according to the second embodiment, it suffices to form the through holes 12 larger than those of the first embodiment.

The second embodiment also provides substantially the same advantageous results as the first embodiment. According to the second embodiment, the distance between the through hole 11 and the through hole 12 may be made smaller than that in the first embodiment. It is thus easier to reduce the likelihood of radio waves leaking through between the through hole 11 and the through hole 12. It may be noted that, as an alternative arrangement, the width of each of the through holes 11 may be larger than the width of each of the through holes 12.

Third Embodiment

There will be a description of a third embodiment. The third embodiment is different from the second embodiment mainly in the configuration of the core interconnect substrate.

[Structure of Waveguide Substrate]

Figure 9:
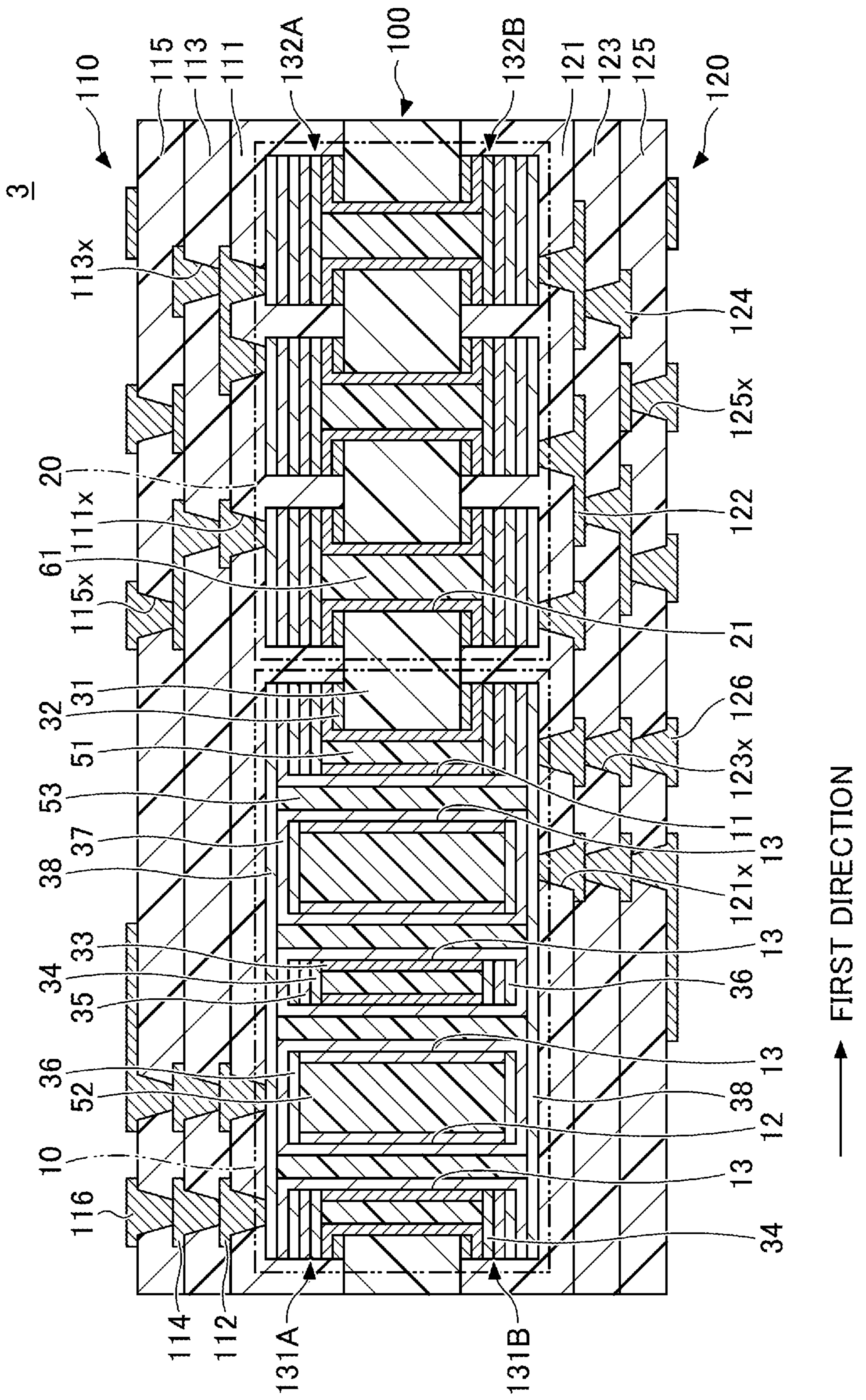
FIG. 9 is a cross-sectional view illustrating an example of a waveguide substrate according to a third embodiment.
Figure 10:
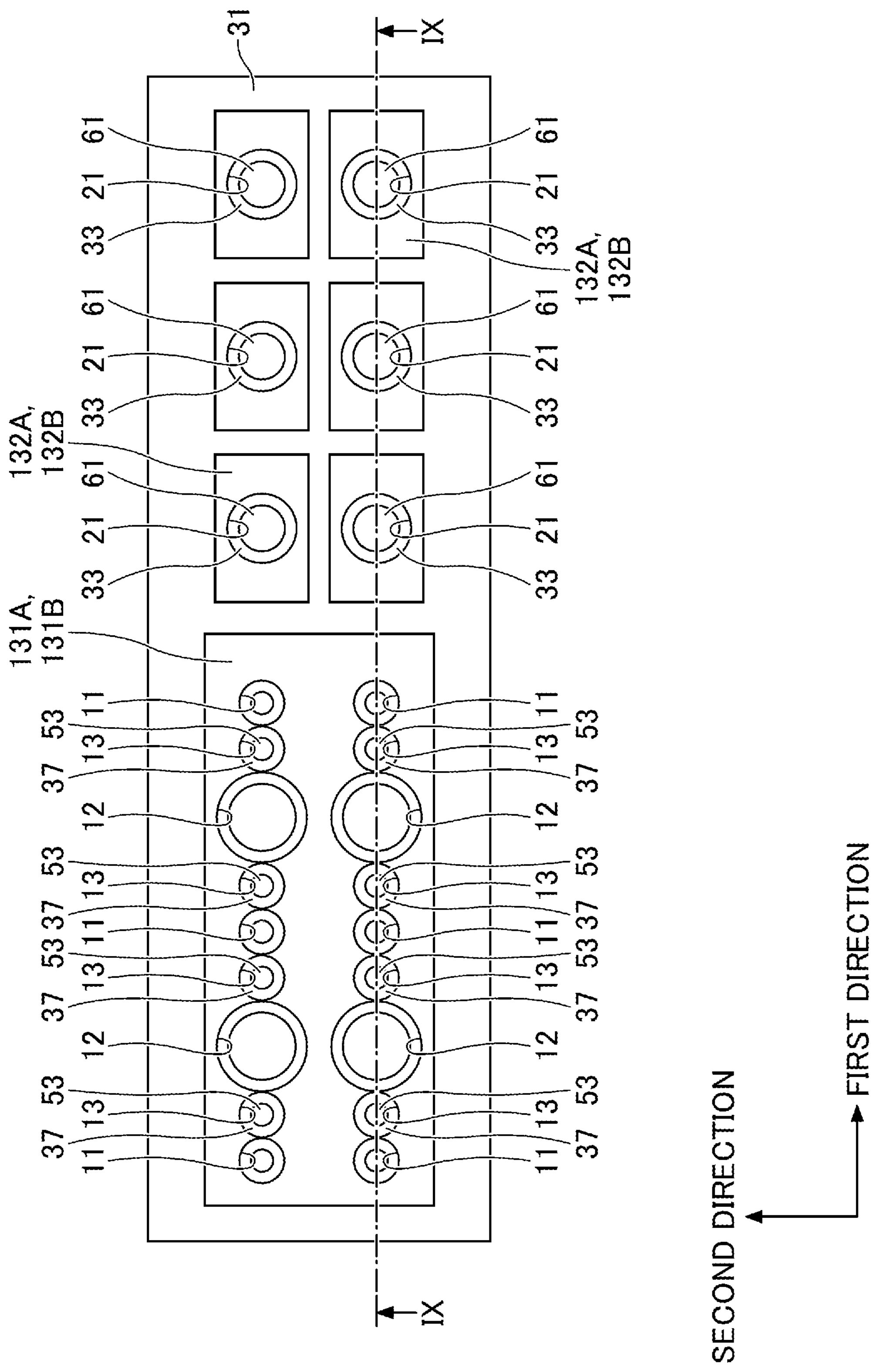
FIG. 10 is a schematic view illustrating an example of the arrangement of through holes in the waveguide substrate according to the third embodiment.

There will first be a description of the structure of a waveguide substrate. FIG. 9 is a cross-sectional view illustrating an example of a waveguide substrate according to a third embodiment. FIG. 10 is a schematic view illustrating an example of the arrangement of through holes in the waveguide substrate according to the third embodiment. FIG. 9 corresponds to a view of a cross-section taken along the line IX-IX in FIG. 10.

As illustrated in FIGS. 9 and 10, a waveguide substrate 3 according to the third embodiment is configured such that the core interconnect substrate 100 further includes conductive layers 37 and 38 and a filler material 53. The conductive layers 37 and 38 are made of a metal such as copper. The conductive layers 37 and 38 may be copper plating layers. The filler material 53 is made of an insulating material. The filler material 53 may be, for example, an insulating resin (e.g., an epoxy-based resin) containing a filler such as silica.

<First Region 10>

There will be a description of the first region 10. In the first region 10, a plurality of through holes 13 are formed in a laminate of the core substrate 31, the conductive layers 32 disposed on the respective upper and lower sides, the conductive layer 33, the conductive layers 34 disposed on the respective upper and lower sides, the conductive layer 35, and the conductive layers 36 disposed on the respective upper and lower sides, such as to extend through the laminate in the thickness direction. One of the through holes 13 is situated between any given one of the through holes 11 and one of the through holes 12 adjacent thereto in the first direction. The through holes 11, and 12, 13 sequentially arranged in the first direction form two rows arranged side by side in the second direction. The plane shape of each through hole 13 is, for example, a circular shape having a diameter of 100 μm. The plane shape of each through hole 13 may alternatively be an elliptical shape, a rectangular shape, or the like. The through holes 13 are an example of third through holes.

In the first direction, each through hole 13 may be in contact with a corresponding one of the through holes 11 or 12, or may be in contact with both a corresponding one of the through holes 11 and a corresponding one of the through holes 12. Alternatively, each through hole 13 may be disposed apart from any of the through holes 11 and 12 in the first direction.

In the first region 10, the conductive layer 37 covers the inner wall surface of the through hole 13, the upper surface of the conductive layer 36 disposed on the upper side of the core substrate 31, and the lower surface of the conductive layer 36 disposed on the lower side of the core substrate 31. The conductive layer 37 is in direct contact with the inner wall surface of the through hole 13, the upper surface of the conductive layer 36 situated on the upper side of the core substrate 31, and the lower surface of the conductive layer 36 situated on the lower side of the core substrate 31. The conductive layer 37 in the first region 10 is an example of a fourth conductive layer.

The filler material 53 is provided in a space surrounded by the conductive layer 37 in each through hole 13 and fills the through hole 13. The upper surface of the filler material 53 is flush with the upper surface of the conductive layer 37, and the lower surface of the filler material 53 is flush with the lower surface of the conductive layer 37. The filler material 53 is an example of a third filler material.

In the first region 10, the conductive layers 38 are provided on the respective upper and lower sides of the core substrate 31. The upper conductive layer 38 disposed above the core substrate 31 covers the upper surface of the conductive layer 37 and the upper surface of the filler material 53. The lower conductive layer 38 disposed below the core substrate 31 covers the lower surface of the conductive layer 37 and the lower surface of the filler material 53. In the third embodiment, the conductive layers 38 are an example of the third conductive layers.

In the first region 10, a conductive layer 131A having a flat plate shape is formed as a laminate of the conductive layers 32, 33, 34, 35, 36, 37, and 38 on the upper side of the core substrate 31, and a conductive layer 131B having a flat plate shape is formed as a laminate of the conductive layers 32, 33, 34, 35, 36, 37, and 38 on the lower side of the core substrate 31.

<Second Region 20>

There will be a description of the second region 20. In the second region 20, the conductive layers 37 are provided on the respective upper and lower sides of the core substrate 31. The upper conductive layer 37 disposed above the core substrate 31 covers the upper surface of the conductive layer 36. The lower conductive layer 37 disposed below the core substrate 31 covers the lower surface of the conductive layer 36.

In the second region 20, the conductive layers 38 are provided on the respective upper and lower sides of the core substrate 31. The upper conductive layer 38 situated above the core substrate 31 covers the upper surface of the conductive layer 37. The lower conductive layer 38 situated below the core substrate 31 covers the lower surface of the conductive layer 37.

In the second region 20, a conductive layer 132A having a flat plate shape is formed as a laminate of the conductive layers 32, 33, 34, 35, 36, 37, and 38 on the upper side of the core substrate 31, and a conductive layer 132B having a flat plate shape is formed as a laminate of the conductive layers 32, 33, 34, 35, 36, 37, and 38 on the lower side of the core substrate 31.

The remaining configurations are substantially the same as those of the first embodiment.

[Method of Making Waveguide Substrate]

In the following, a method of making a waveguide substrate will be described. FIGS. 11A and 11B and FIGS. 12A and 12B are cross-sectional views illustrating an example of the method of making the waveguide substrate according to the third embodiment.

Figure 11A:
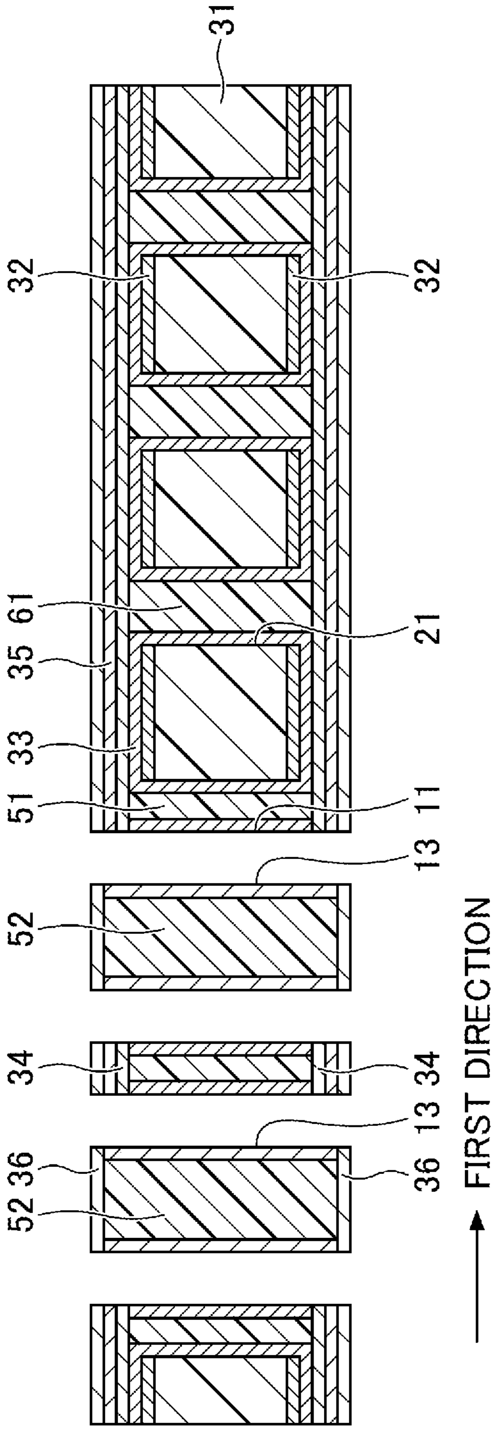
FIGS. 11A and 11B are cross-sectional views illustrating an example of a method of making the waveguide substrate according to the third embodiment.

The process steps up to the formation of the conductive layers 36 are performed in substantially the same manner as in the second embodiment (see FIG. 6A). Thereafter, as illustrated in FIG. 11A, through holes 13 are formed in the laminate of the core substrate 31, the conductive layers 32 disposed on the respective upper and lower sides, the conductive layer 33, the conductive layers 34 disposed on the respective upper and lower sides, the conductive layer 35, and the conductive layers 36 on the respective upper and lower sides. The through holes 13 may be formed by using a drill, a laser, or the like.

Figure 11B:
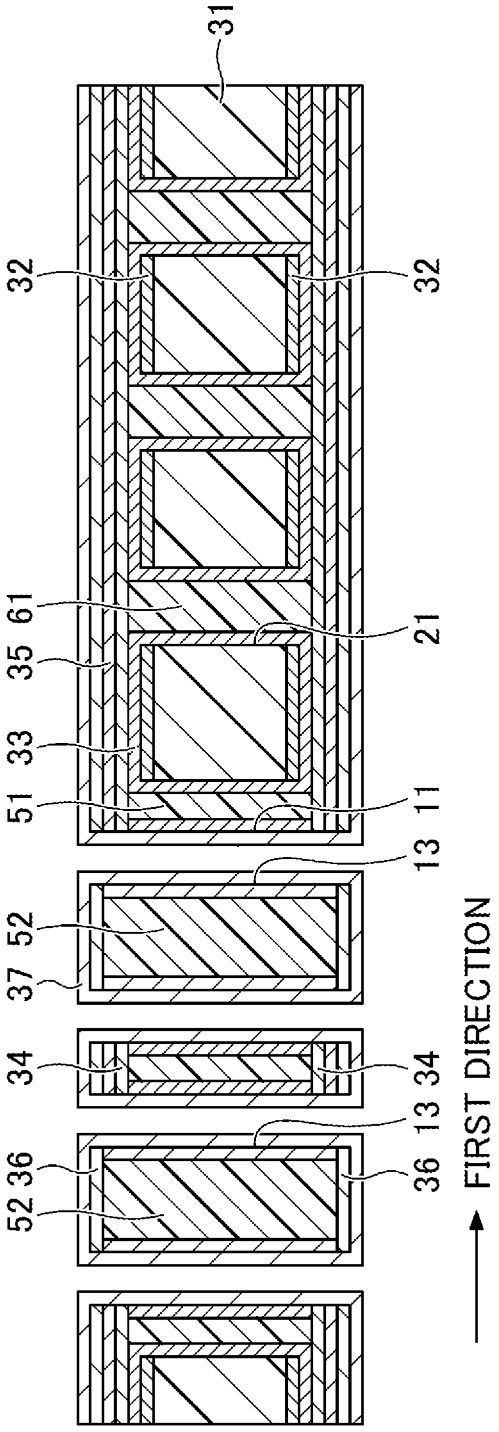

Subsequently, a desmear treatment is performed on the surfaces of the conductive layers 36 and the inner wall surfaces of the through holes 13, and, then, as illustrated in FIG. 11B, a conductive layer 37 is formed on the surfaces of the conductive layers 36 and the inner wall surfaces of the through holes 13. The conductive layer 37 may be, for example, a copper plating layer. In order to form the conductive layer 37, an electroless copper plating film may be formed, and, then, an electrolytic copper plating film may be formed on the electroless copper plating film by an electrolytic plating method using the electroless copper plating film as a power feeding path for plating.

Figure 12A:
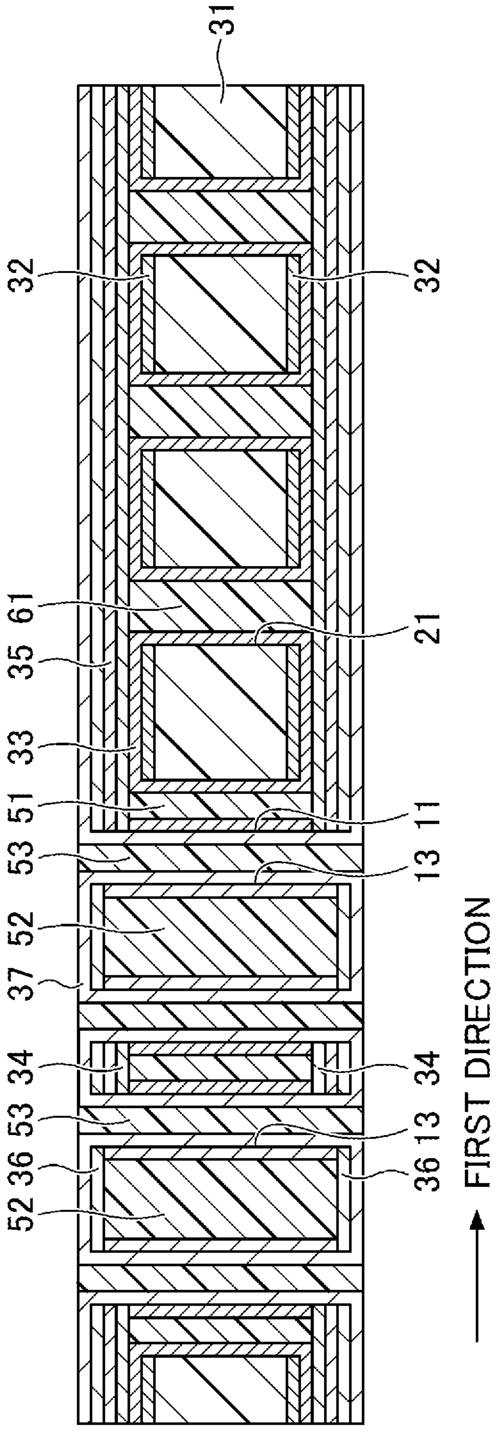
FIGS. 12A and 12B are cross-sectional views illustrating the example of the method of making the waveguide substrate according to the third embodiment.

As illustrated in FIG. 12A, the through holes 13 are filled with a filler material 53. The filler material 53 may be disposed by screen printing, for example. The filler material 53 is provided on the conductive layer 37 in the through holes 13. The filler material 53 is then cured, followed by removing the portions of the filler material 53 protruding from the upper surface or the lower surface of the conductive layer 37. With this arrangement, the upper surface of the conductive layer 37 and the upper surface of the filler material 53 become flush with each other, and the lower surface of the conductive layer 37 and the lower surface of the filler material 53 become flush with each other. When the filler material 53 contains a thermo-setting material such as epoxy resin, the filler material 53 may be cured by heating. The protruding portions of the filler material 53 may be removed by buffing or roll polishing, for example.

Figure 12B:
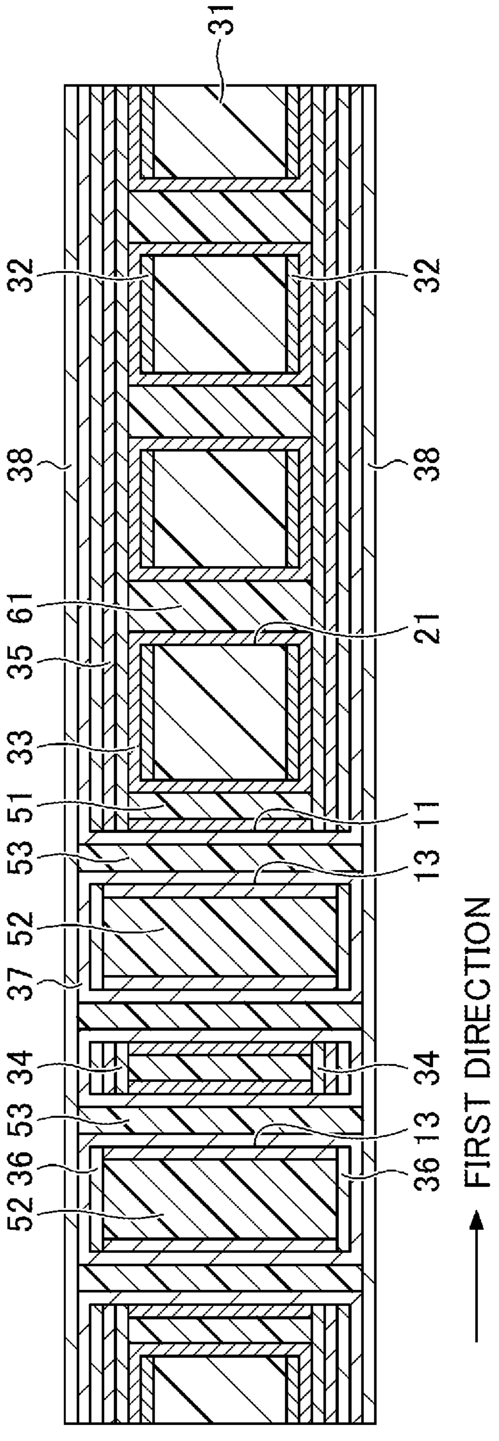

The surfaces of the conductive layer 37 and the surfaces of the filler material 53 are thereafter subjected to a desmear treatment. Then, as illustrated in FIG. 12B, the conductive layers 38 are formed on the surfaces of the conductive layer 37 and the surfaces of the filler material 53. The conductive layers 38 may be, for example, a copper plating layer. In order to form the conductive layers 38, a electroless copper plating film is formed, and, then, an electrolytic copper plating film is formed on the electroless copper plating film by an electrolytic plating method using the electroless copper plating film as a power feeding path for plating. Afterwards, polishing is performed.

The conductive layers 38, 37, 36, 35, 34, 33, and 32 are then patterned. For example, the conductive layers 38, 37, 36, 35, 34, 33, and 32 may be patterned by photolithography and etching. As a result, conductive layers 131A, 131B, 132A, and 132B are formed. That is, the conductive layers 131A, 131B, 132A, and 132B are formed from the conductive layers 38, 37, 36, 35, 34, 33, and 32 by the subtractive method.

The above description has detailed the making of the core interconnect substrate 100.

Subsequently, build-up layer structures 110 and 120 are formed, thereby making the waveguide substrate 3 according to the third embodiment.

The third embodiment also provides substantially the same advantageous results as the second embodiment. In the third embodiment, one through hole 13 and the conductive layer 37 are provided between through holes 11 and 12 adjacent to each other, which facilitates further reducing the likelihood of radio waves leaking through between the adjacent through holes 11 and 12.

Each through hole 13 may be disposed apart from at least one of the through holes 11 and 12, and one or more through holes may be provided at the gap, with a conductive layer disposed on the inner wall surface of such one or more through holes. That is, four or more sets of process steps may be performed, with each of the sets forming through holes and forming a conductive layer on the inner wall surfaces of the through holes.

Fourth Embodiment

There will be a description of a fourth embodiment. The fourth embodiment differs from the first embodiment mainly in the configuration of the core interconnect substrate.

[Structure of Waveguide Substrate]

Figure 13:
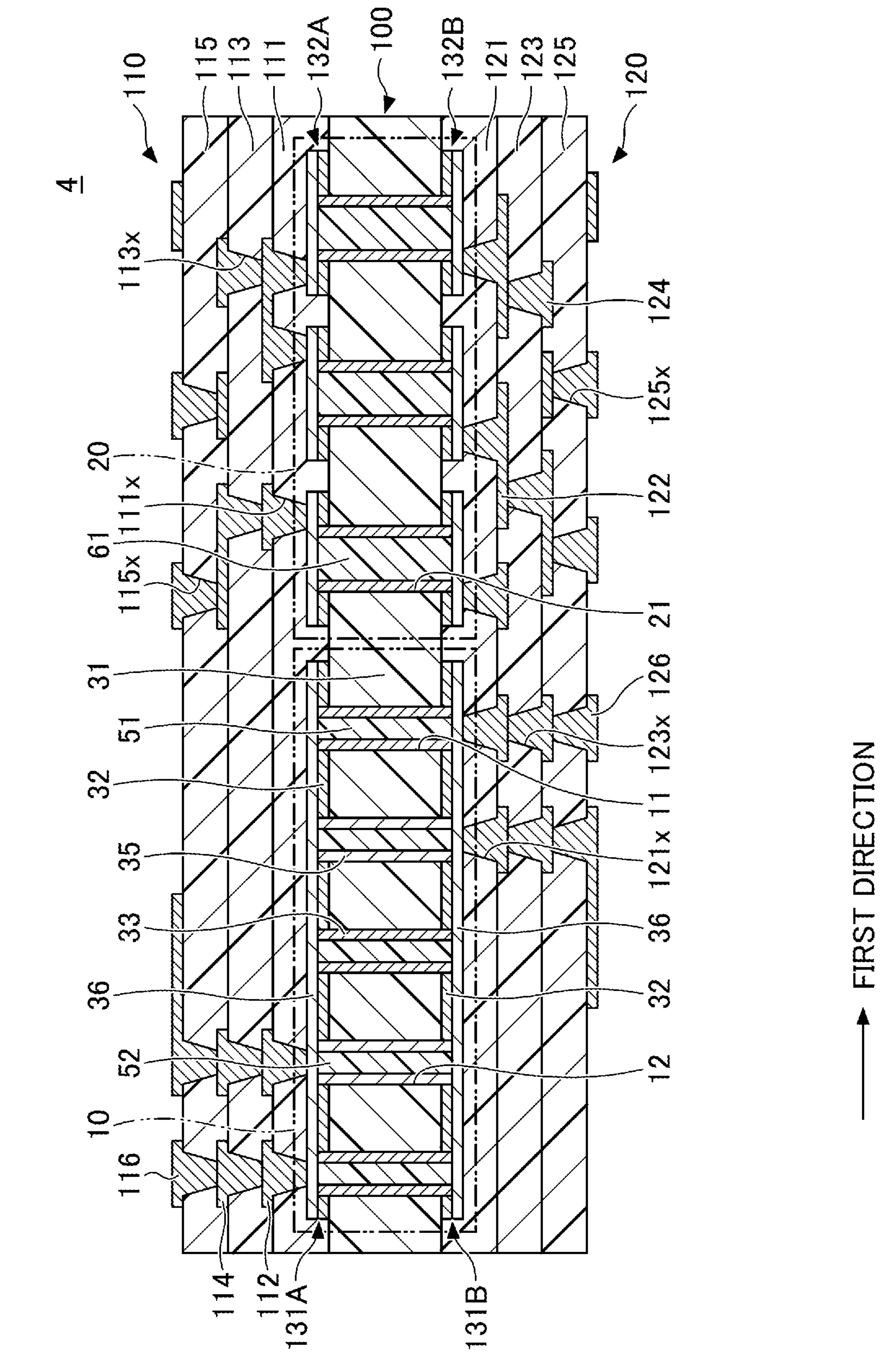
FIG. 13 is a cross-sectional view illustrating an example of a waveguide substrate according to a fourth embodiment.

There will first be a description of the structure of a waveguide substrate. FIG. 13 is a cross-sectional view illustrating an example of a waveguide substrate according to the fourth embodiment.

In a waveguide substrate 4 according to the fourth embodiment, a core interconnect substrate 100 includes a core substrate 31, conductive layers 32, 33, 35, and 36, and filler materials 51, 52, and 61.

<First Region 10>

There will now be a description of the first region 10. In the first region 10, a plurality of through holes 11 are formed in a laminate of the core substrate 31 and the conductive layers 32 disposed on the respective upper and lower sides, and extends through the laminate in the thickness direction. As illustrated in FIG. 13, the plurality of through holes 11 are arranged in a row along the first direction. Two rows of the through holes 11 are arranged side by side in the second direction.

In the first region 10, the conductive layer 33 covers the inner wall surface of each of the through holes 11. The conductive layer 33 is in direct contact with the inner wall surface of each of the through hole 11.

A filler material 51 is provided in a space surrounded by the conductive layer 33 inside each through hole 11, and fills the through hole 11. The upper surface of the filler material 51 is flush with the upper surface of the upper conductive layer 32 of the core interconnect substrate 100, and the lower surface of the filler material 51 is flush with the lower surface of the lower conductive layer 32 of the core interconnect substrate 100.

A plurality of through holes 12 are formed in the laminate of the core substrate 31 and the conductive layers 32 disposed on the respective upper and lower sides, and extend through the laminate in the thickness direction. As illustrated in FIG. 13, any given one of the through holes 12 is disposed between two through holes 11 adjacent to each other in the first direction. The through holes 11 and 12 alternately arranged in the first direction form two rows arranged side by side in the second direction.

In the first region 10, the conductive layer 35 covers the inner wall surface of each of through holes 12. The conductive layer 35 is in direct contact with the inner wall surface of each of the through holes 12.

The filler material 52 is provided in a space surrounded by the conductive layer 35 inside each through hole 12 and fills the through hole 12. The upper surface of the filler material 52 is flush with the upper surface of the upper conductive layer 32 of the core interconnect substrate 100, and the lower surface of the filler material 52 is flush with the lower surface of the lower conductive layer 32 of the core interconnect substrate 100.

In the first region 10, the conductive layers 36 are provided on the respective upper and lower sides of the core substrate 31. The upper conductive layer 36 situated over the core substrate 31 covers the upper surface of the conductive layer 32, the upper surfaces of the filler material 51, the upper surfaces of the filler material 52, the upper end surfaces of the conductive layer 33, and the upper end surfaces of the conductive layer 35. The lower conductive layer 36 situated under the core substrate 31 covers the lower surface of the conductive layer 32, the lower surfaces of the filler material 51, the lower surfaces of the filler material 52, the lower end surfaces of the conductive layer 33, and the lower end surfaces of the conductive layer 35.

In the first region 10, a conductive layer 131A having a flat plate shape is formed as a laminate of the conductive layers 32, 33, 35, and 36 on the upper side of the core substrate 31, and a conductive layer 131B having a flat plate shape is formed as a laminate of the conductive layers 32, 33, 35, and 36 on the lower side of the core substrate 31. The thicknesses of the thickest portions the of conductive layers 131A and 131B may both be 0.01 mm to 0.1 mm. The thicknesses of the thickest portions of the conductive layers 131A and 131B may preferably be 0.015 mm to 0.025 mm.

<Second Region 20>

There will now be a description of the second region 20. In the second region 20, a plurality of through holes 21 are formed in a laminate of the core substrate 31 and the conductive layers 32 disposed on the respective upper and lower sides, and extend through the laminate in the thickness direction.

In the second region 20, the conductive layer 33 covers the inner wall surface of each of the through holes 21. The conductive layer 33 is in direct contact with the inner wall surface of each of the through holes 21.

The filler material 61 is provided in a space surrounded by the conductive layer 33 inside each through hole 21, and fills the through hole 21. The upper surface of the filler material 61 is flush with the upper surface of the upper conductive layer 32 of the core interconnect substrate 100, and the lower surface of the filler material 61 is flush with the lower surface of the lower conductive layer 32 of the core interconnect substrate 100.

In the second region 20, the conductive layers 36 are provided on the respective upper and lower sides of the core substrate 31. The upper conductive layer 36 disposed over the core substrate 31 covers the upper surface of the conductive layer 32, the upper surfaces of the filler material 51, and the upper end surfaces of the conductive layer 33. The lower conductive layer 36 disposed under the core substrate 31 covers the lower surface of the conductive layer 32, the lower surfaces of the filler material 51, and the lower end surfaces of the conductive layer 33.

In the second region 20, a conductive layer 132A having a flat plate shape is formed as a laminate of the conductive layers 32, 33, 35, and 36 on the upper side of the core substrate 31, and a conductive layer 132B having a flat plate shape is formed as a laminate of the conductive layers 32, 33, 35, and 36 on the lower side of the core substrate 31.

The remaining configurations are substantially the same as those of the first embodiment.

[Method of Making Waveguide Substrate]

In the following, a method of making a waveguide substrate will be described. FIGS. 14A to 14C through FIGS. 16A to 16C are cross-sectional views illustrating a method of making the waveguide substrate according to the fourth embodiment.

Figure 14A:
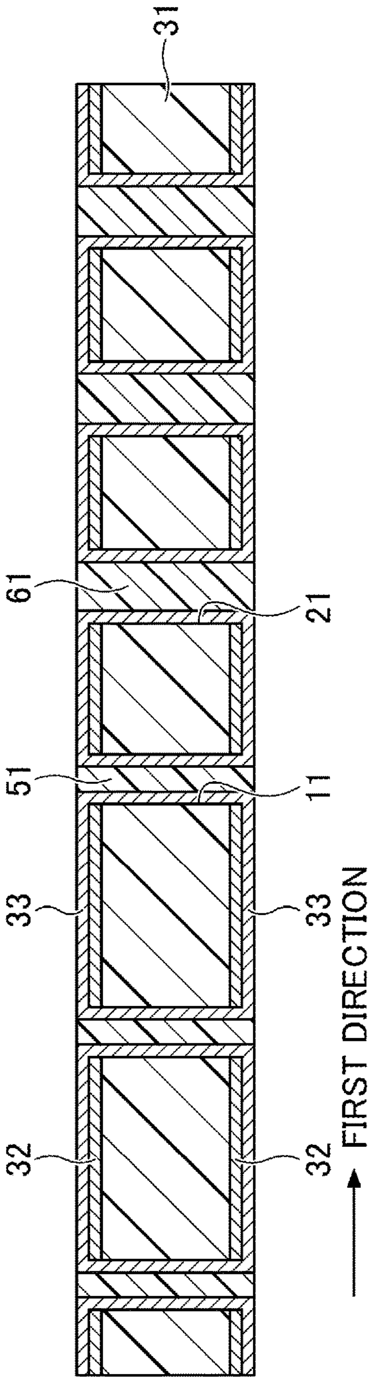
FIGS. 14A through 14C are cross-sectional views illustrating an example of a method of making the waveguide substrate according to the fourth embodiment.
Figure 14B:
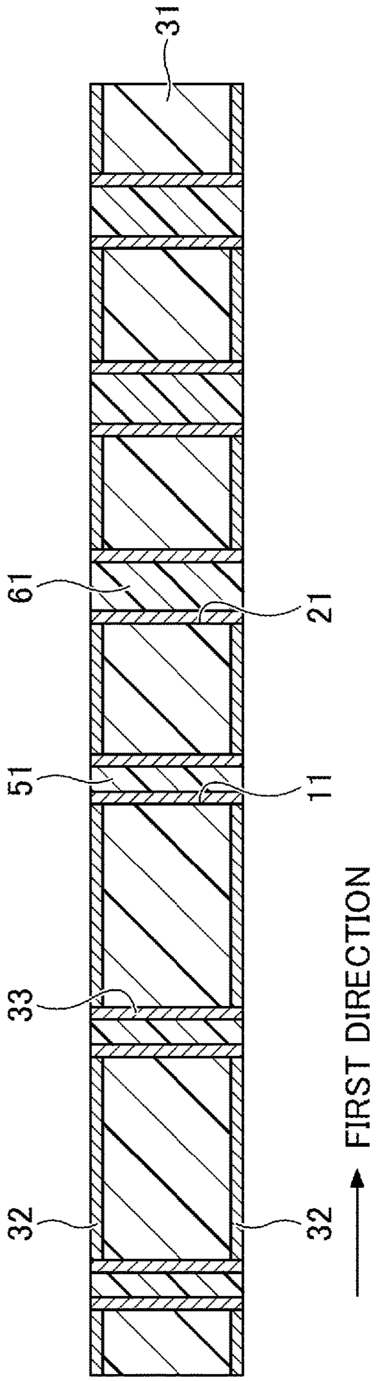

In substantially the same manner as in the first embodiment, the process steps up to the formation of the filler materials 51 and 61 are performed as illustrated in FIG. 14A. Thereafter, as illustrated in FIG. 14B, the conductive layer 33, the filler material 51, and the filler material 61 are polished until the conductive layers 32 are exposed on the respective upper and lower sides of the core interconnect substrate 100.

Figure 14C:
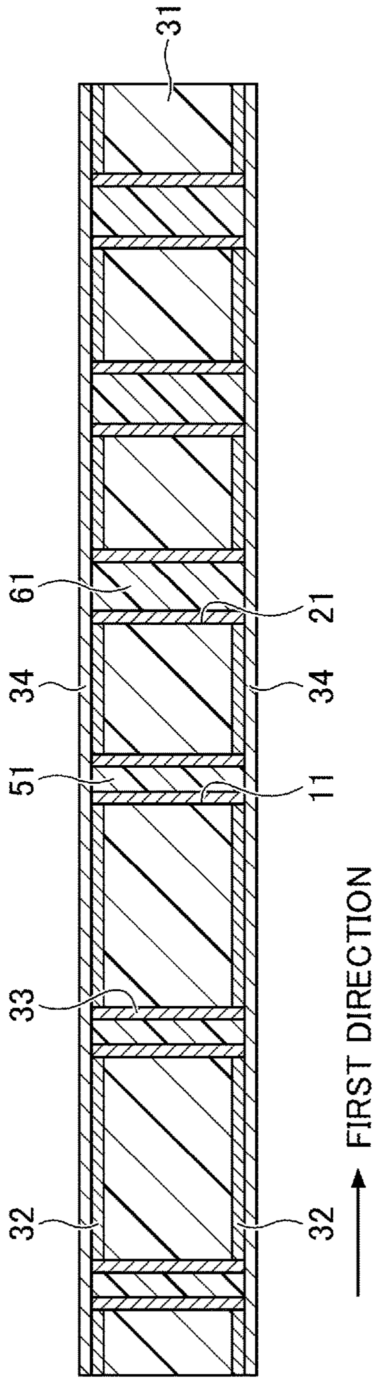

Subsequently, the surfaces of the conductive layers 32, the end surfaces of the conductive layers 33, and the surfaces of the filler materials 51 and 61 are subjected to a desmear treatment. Then, as illustrated in FIG. 14C, conductive layers 34 are formed on the surfaces of the conductive layers 32, on the end surfaces of the conductive layers 33, and on the surfaces of the filler materials 51 and 61.

Figure 15A:
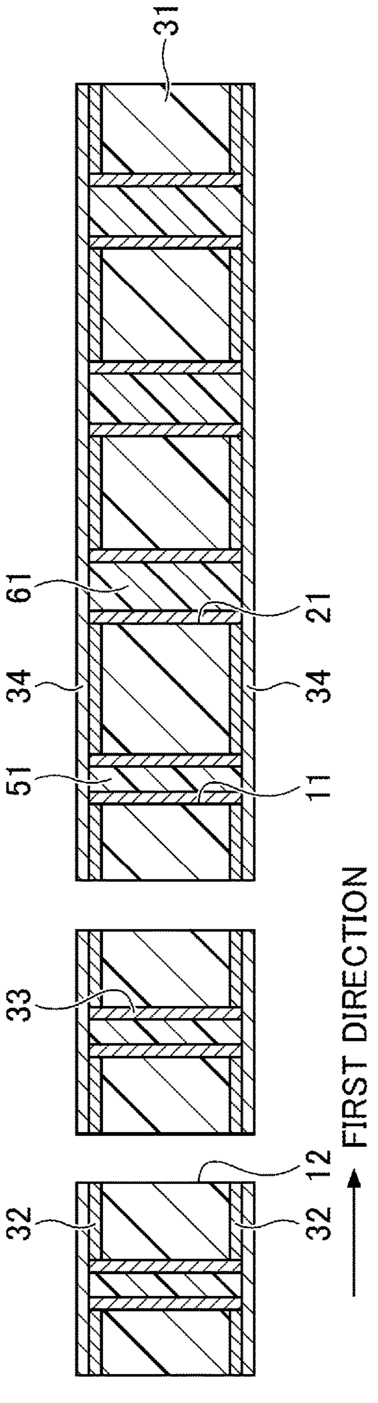
FIGS. 15A through 15C are cross-sectional views illustrating the example of the method of making the waveguide substrate according to the fourth embodiment.

As illustrated in FIG. 15A, through holes 12 are formed in a laminate of the core substrate 31, the conductive layers 32 disposed on the respective upper and lower sides, and the conductive layers 34 disposed on the respective upper and lower sides.

Figure 15B:
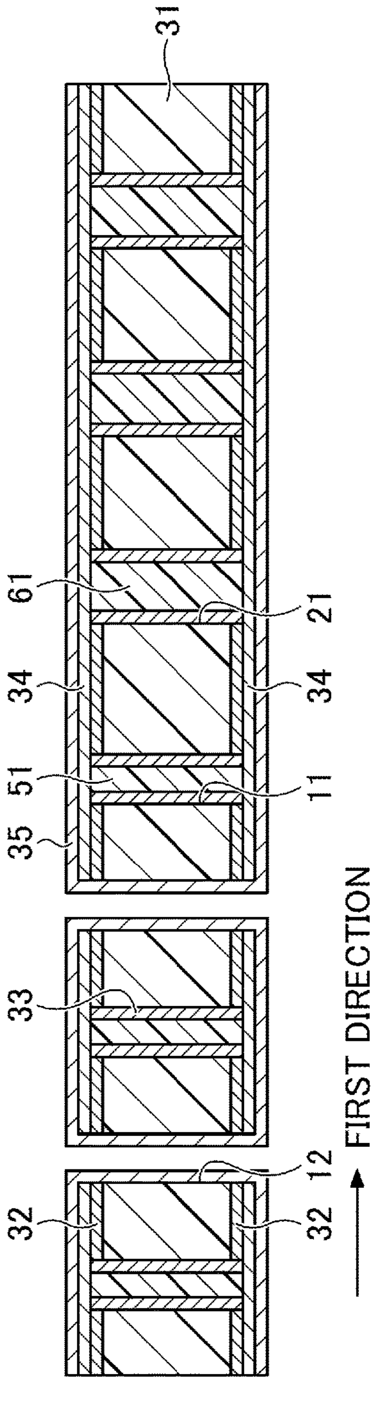

A desmear treatment is then performed on the surfaces of the conductive layers 34 and the inner wall surfaces of the through holes 12. Afterwards, as illustrated in FIG. 15B, a conductive layer 35 is formed on the surfaces of the conductive layers 34 and the inner wall surfaces of the through holes 12.

Figure 15C:
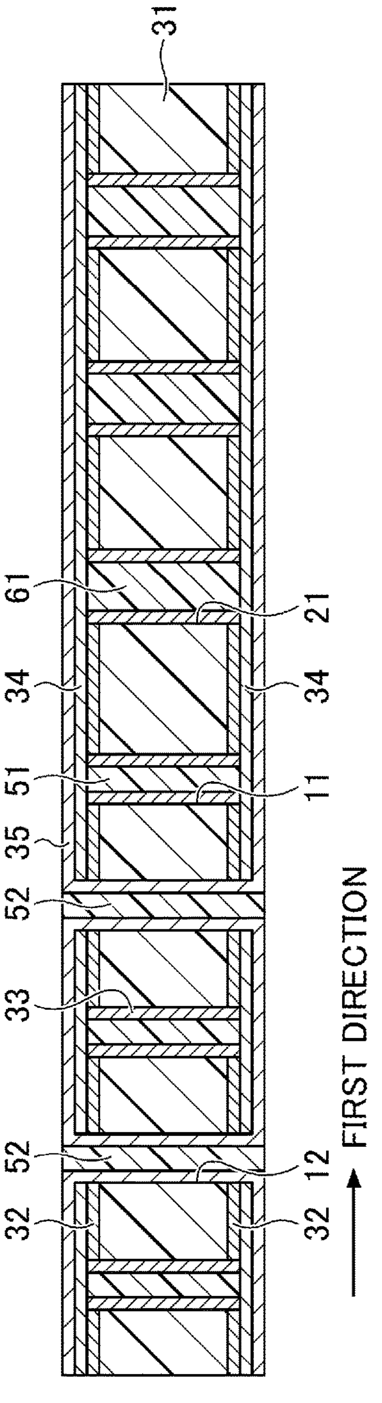

As illustrated in FIG. 15C, the through holes 12 are then filled with the filler material 52.

Figure 16A:
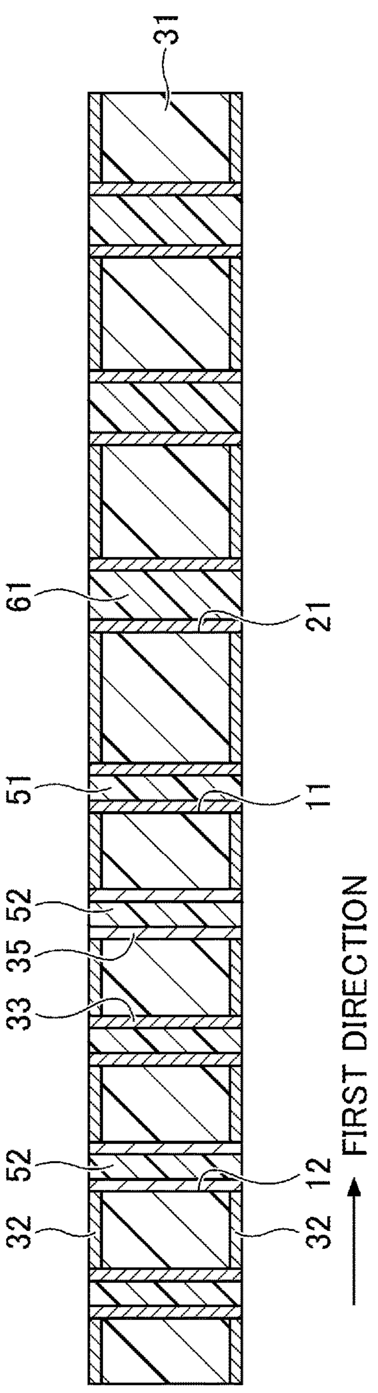
FIGS. 16A through 16C are cross-sectional views illustrating the example of the method of making the waveguide substrate according to the fourth embodiment.

Subsequently, as illustrated in FIG. 16A, the conductive layer 35, the conductive layers 34, and the filler materials 52 are polished until the conductive layers 32, the filler materials 51, and the filler materials 61 are exposed on the upper and lower sides of the core interconnect substrate 100.

Figure 16B:
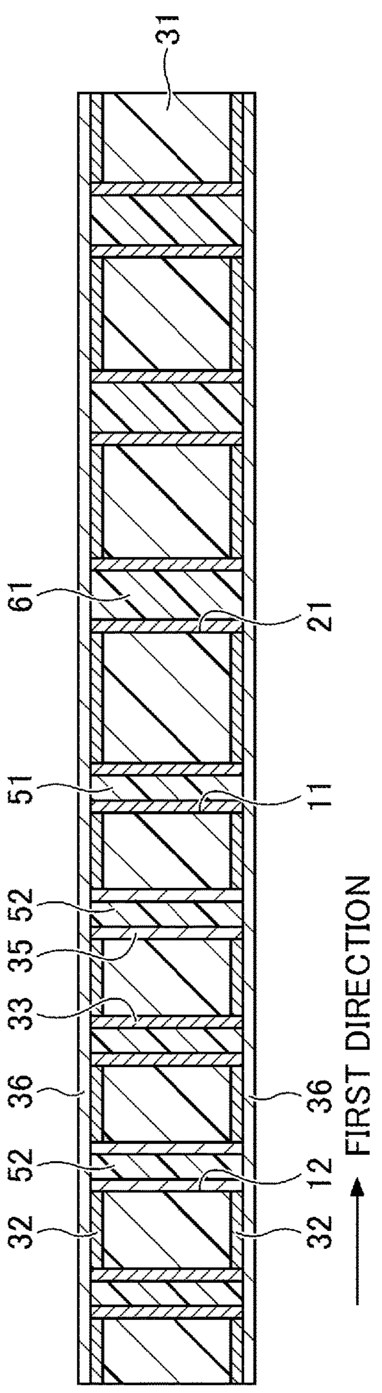

The surfaces of the conductive layers 32, the end surfaces of the conductive layers 33 and 34, and the surfaces of the filler materials 51, 52, and 61 are then subjected to a desmear treatment. Afterwards, as illustrated in FIG. 16B, the conductive layers 36 are formed on the surfaces of the conductive layers 32, on the end surfaces of the conductive layers 33 and 35, and on the surfaces of the filler materials 51, 52, and 61.

Figure 16C:
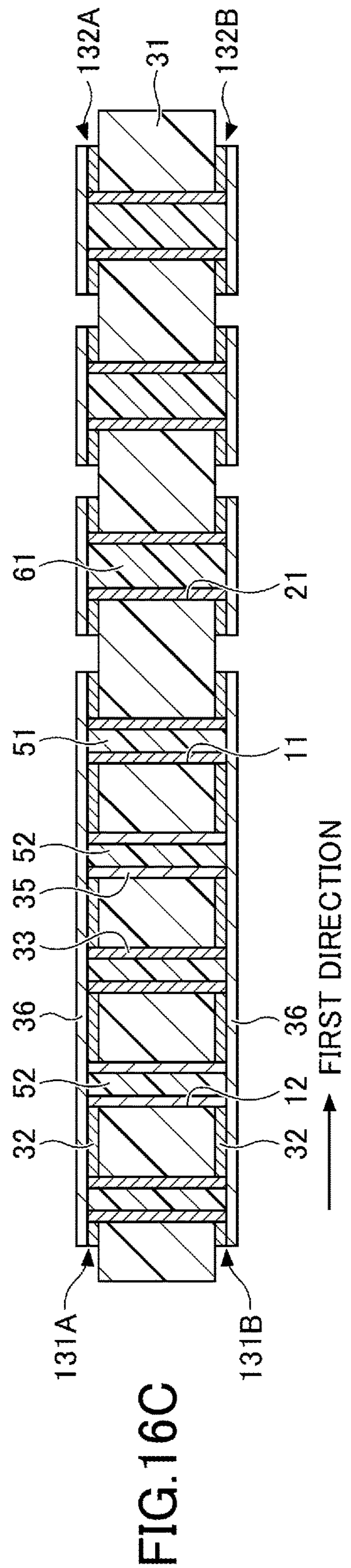

As illustrated in FIG. 16C, the conductive layers 36 and 32 are patterned. For example, the conductive layers 36 and 32 may be patterned by photolithography and etching. As a result, conductive layers 131A, 131B, 132A, and 132B are formed. That is, the conductive layers 131A, 131B, 132A, and 132B are formed from the conductive layers 36, 35, 33, and 32 by the subtractive method.

The above description has detailed the making of the core interconnect substrate 100.

Subsequently, the build-up layer structures 110 and 120 are formed, thereby making the waveguide substrate 4 according to the fourth embodiment.

The fourth embodiment also provides substantially the same advantageous results as those of the first embodiment. Further, the fourth embodiment allows the thickness of the waveguide substrate 4 to be made smaller than the thickness of the waveguide substrate 1. The fourth embodiment is thus suitable for producing thinner substrates.

Fifth Embodiment

Figure 17:
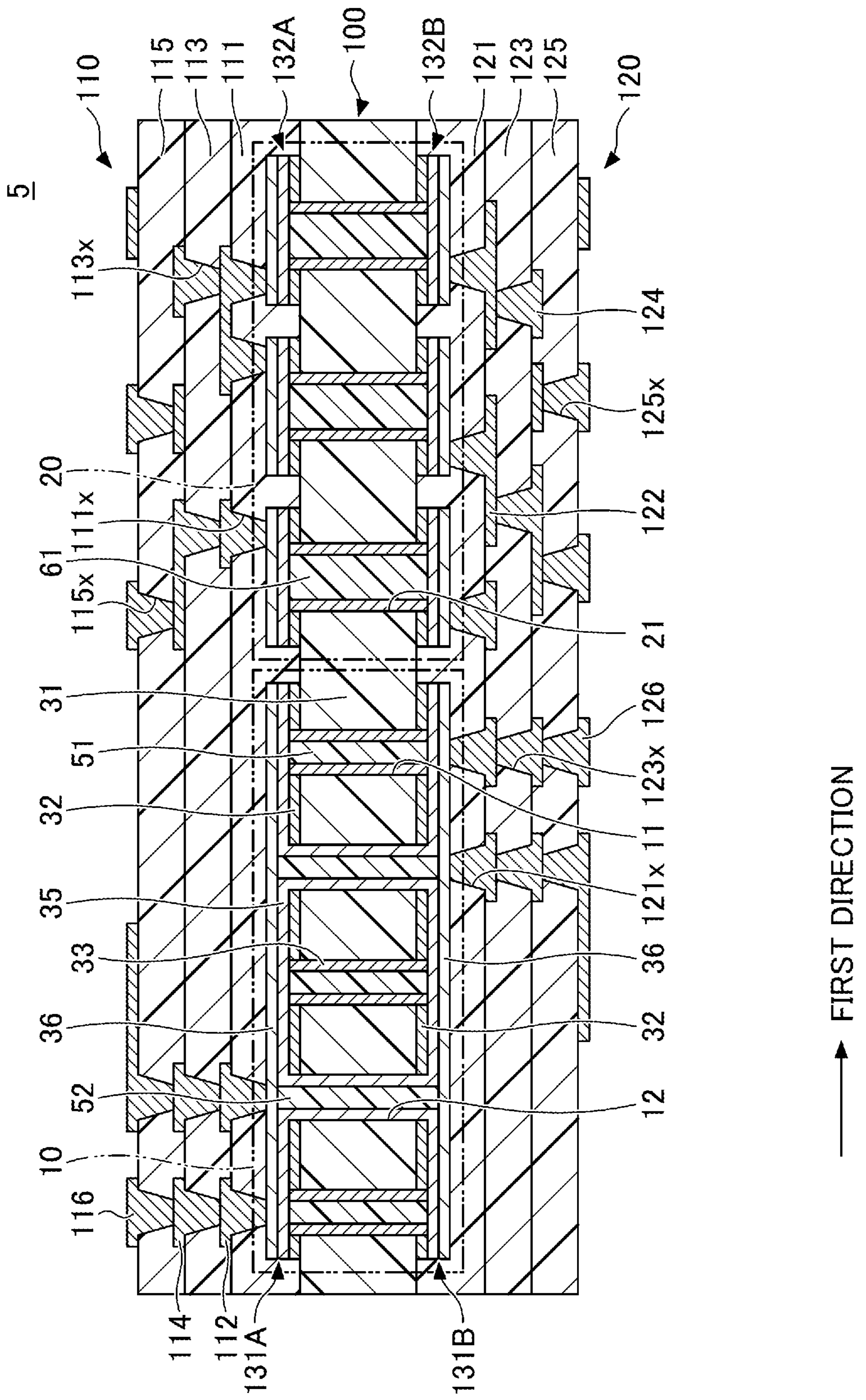
FIG. 17 is a cross-sectional view illustrating an example of a waveguide substrate according to a fifth embodiment.

There will be a description of a fifth embodiment. The fifth embodiment differs from the fourth embodiment mainly in the configuration of the core interconnect substrate. FIG. 17 is a cross-sectional view illustrating an example of a waveguide substrate according to the fifth embodiment.

As illustrated in FIG. 17, a waveguide substrate 5 according to the fifth embodiment is configured such that the conductive layer 35 covers the inner wall surfaces of the through holes 12, the upper surface of the upper conductive layer 32 disposed on the upper side of the core substrate 31, and the lower surface of the lower conductive layer 32 disposed on the lower side of the core substrate 31 in the first region 10, as in the first embodiment. In the first region 10, the upper conductive layer 36 situated over the core substrate 31 covers the upper surface of the conductive layer 35 and the upper surfaces of the filler materials 52, and the lower conductive layer 36 situated under the core substrate 31 covers the lower surface of the conductive layer 35 and the lower surfaces of the filler materials 52.

The remaining configurations are substantially the same as those of the fourth embodiment.

In order to make the waveguide substrate 5 according to the fifth embodiment, the formation of the conductive layer 34 and the polishing of the conductive layer 35 may be omitted while polishing the conductive layer 33.

The fifth embodiment also provides substantially the same advantageous results as the fourth embodiment.

Sixth Embodiment

Figure 18:
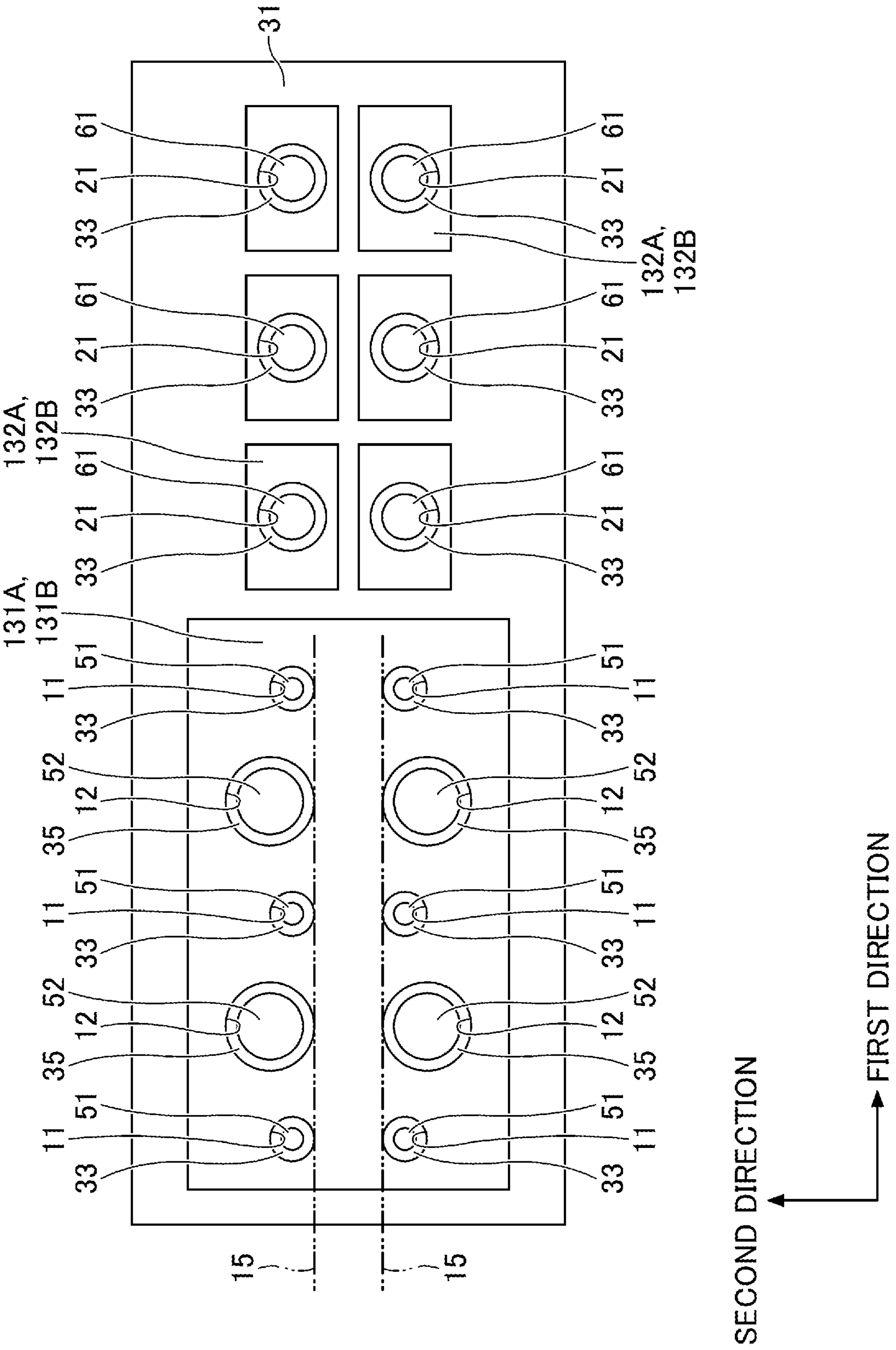
FIG. 18 is a schematic view illustrating an example of the arrangement of through holes in a waveguide substrate according to a sixth embodiment.

There will be a description of a sixth embodiment. The sixth embodiment differs from the second embodiment mainly in the arrangement of the through holes 12. FIG. 18 is a schematic view illustrating an example of the arrangement of through holes in a waveguide substrate according to the sixth embodiment.

As illustrated in FIG. 18, the waveguide substrate the sixth embodiment is configured such that the distance between two through holes 12 situated next to each other in the second direction is equal to the distance between two through holes 11 situated next to each other in the second direction. Further, a virtual plane 15 that is tangential to the side surfaces of the through holes 11 arranged in a first row along the first direction and that is situated toward the second row is also tangential to the side surfaces of the through holes 12 arranged also in the first row. That is, as virtual planes 15, there exist virtual flat planes, each of which connects the points on the side surfaces of the through holes 11 and 12 arranged in a row along the first direction, such that the points are the closest to the other row.

The remaining configurations are substantially the same as those of the second embodiment.

The sixth embodiment also provides substantially the same advantageous results as the second embodiment. In the sixth embodiment, the virtual planes 15 are substantially flat, so that the size of the cross section of the waveguide that simulates a rectangular waveguide is constant even through the diameter of the through holes 11 is different from the diameter of the through holes 12. This arrangement enables the frequency of transmitted and received radio waves to be more stable.

Seventh Embodiment

Figure 19:
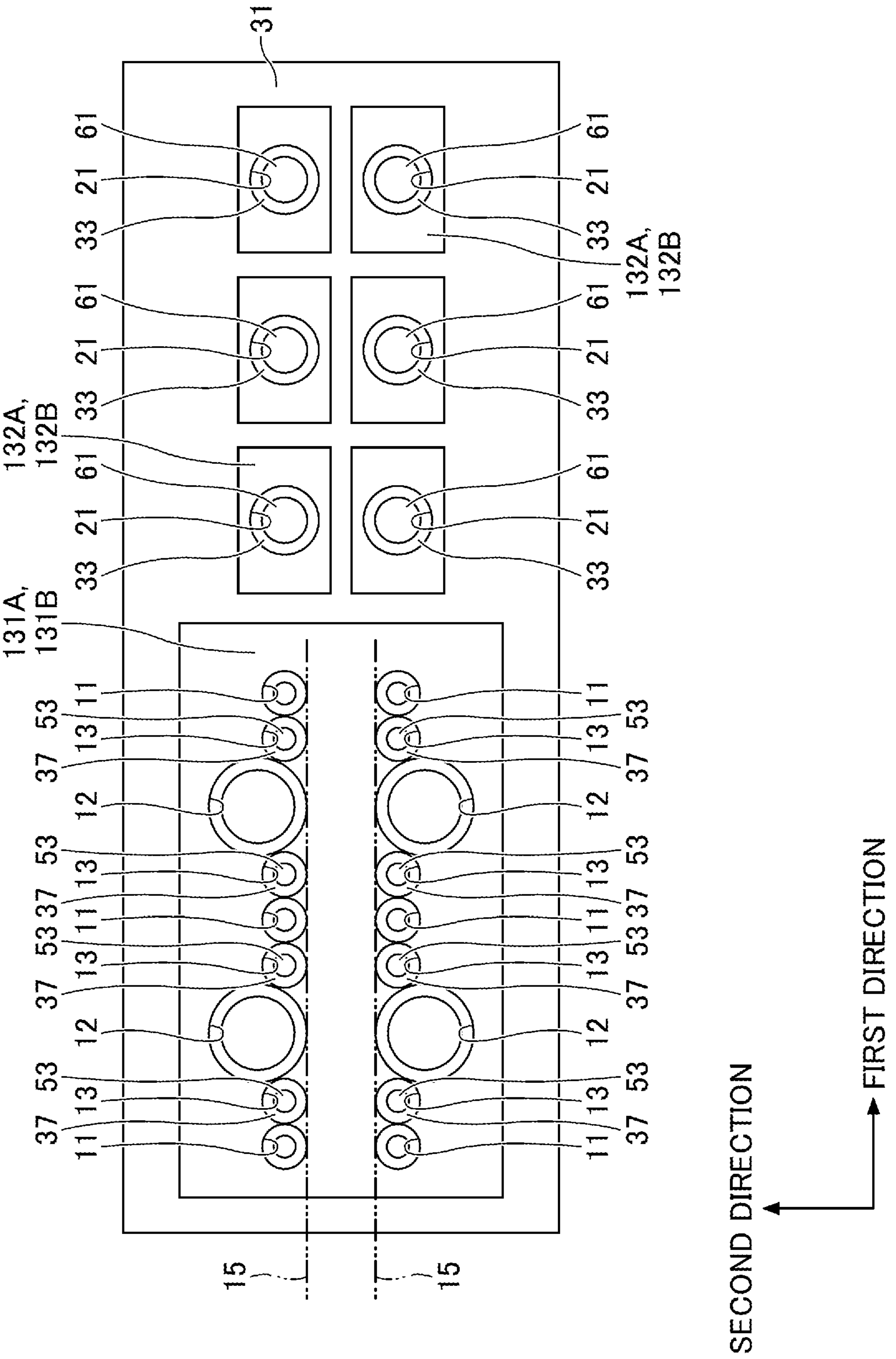
FIG. 19 is a schematic view illustrating an example of the arrangement of through holes in a waveguide substrate according to a seventh embodiment.

There will be a description of a seventh embodiment. The seventh embodiment differs from the third embodiment mainly in the arrangement of the through holes 12. FIG. 19 is a schematic view illustrating an example of the arrangement of through holes in a waveguide substrate according to the seventh embodiment.

As illustrated in FIG. 19, the waveguide substrate according to the seventh embodiment is configured such that the distance between two through holes 12 situated next to each other in the second direction is equal to both the distance between two through holes 11 situated next to each other in the second direction and the distance between two through holes 13 situated next to each other in the second direction. Further, a virtual plane 15 that is tangential to the side surfaces of the through holes 11 and 13 arranged in a first row along the first direction and that is situated toward the second row is also tangential to the side surfaces of the through holes 12 arranged also in the first row. That is, as virtual planes 15, there exist virtual flat planes, each of which connects the points on the side surfaces of the through holes 11, 12, and 13 arranged in a row along the first direction, such that the points are the closest to the other row.

The remaining configurations are substantially the same as those of the third embodiment.

The seventh embodiment also provides substantially the same advantageous results as the third embodiment. In the seventh embodiment, the virtual planes 15 are substantially flat, so that the size of the cross section of the waveguide that simulates a rectangular waveguide is constant even through the diameters of the through holes 11 and 13 are different from the diameter of the through holes 12. This arrangement enables the frequency of transmitted and received radio waves to be more stable.

In second the embodiment, the third embodiment, the sixth embodiment, and the seventh embodiment, polishing may be performed as appropriate as in the fourth embodiment or the fifth embodiment.

According to the disclosed technique, it is possible to suppress a decrease in the strength of the substrate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The present disclosures non-exhaustively include the subject matter set out in the following clauses:

Clause 1. A method of making a waveguide substrate, comprising:

forming first through holes through a core substrate;

forming a first conductive layer that covers an inner wall surface of each of the first through holes and that covers both sides of the core substrate;

filling a first filler material in a space surrounded by the first conductive layer inside each of the first through holes;

forming second through holes through the core substrate after the disposing of the first filler material;

forming a second conductive layer that covers an inner wall surface of each of the second through holes and that covers both sides of the core substrate;

filling a second filler material in a space surrounded by the second conductive layer inside each of the second through holes; and forming third conductive layers on respective sides of the core substrate, the third conductive layers overlapping the first through holes and the second through holes in a plan view and being electrically connected to both the first conductive layer and the second conductive layer.

Clause 2. The method of making a waveguide substrate as recited in clause 1, wherein the first through holes and the second through holes are alternately arranged in a row.

Clause 3. The method of making a waveguide substrate as recited in clause 1, wherein a width of each of the first through holes is different from a width of each of the second through holes.

Clause 4. The method of making a waveguide substrate as recited in clause 1, further comprising: between the filling of the second filler material and the forming of the third conductive layer, forming third through holes through the core substrate;

forming a fourth conductive layer that covers an inner wall surface of each of the third through holes and that covers both sides of the core substrate; and filling a third filler material in a space surrounded by the fourth conductive layer inside each of the third through holes;

wherein the third conductive layers overlap the third through-holes in the plan view and are electrically connected to the fourth conductive layer.

Clause 5. The method of making a waveguide substrate as recited in clause 4, wherein one the third through holes is situated between one of the first through holes and one of the second through holes adjacent to each other.

Clause 6. The method of making a waveguide substrate as recited in clause 1, wherein the second conductive layer overlaps the first through holes in the plan view.

Clause 7. The method of making a waveguide substrate as recited in clause 1, further comprising:

removing a portion of the first conductive layer between the filling of the first filler material and the forming of the second through holes, the portion covering both sides of the core substrate.

What is claimed is:

1. A waveguide substrate comprising:

a core substrate through which first through holes and second through holes are formed;

a first conductive layer covering an inner wall surface of each of the first through holes and covering both upper and lower surfaces of the core substrate;

a second conductive layer covering an inner wall surface of each of the second through holes and covering both the upper and lower surfaces of the core substrate, the second conductive layer being different from the first conductive layer;

a first filler material filling a space surrounded by the first conductive layer inside each of the first through holes, the first filler material being an insulating material;

a second filler material filling a space surrounded by the second conductive layer inside each of the second through holes, the second filler material being an insulating material; and third conductive layers disposed over and under the core substrate, the third conductive layers overlapping the first through holes and the second through holes in a plan view, and the third conductive layers being electrically connected to both the first conductive layer and the second conductive layer, wherein the second conductive layer overlaps the first through holes in the plan view.

2. A waveguide substrate comprising:

a core substrate through which first through holes and second through holes are formed;

a first conductive layer covering an inner wall surface of each of the first through holes and covering both sides of the core substrate;

a second conductive layer covering an inner wall surface of each of the second through holes and covering both sides of the core substrate;

a first filler material filling a space surrounded by the first conductive layer inside each of the first through holes;

a second filler material filling a space surrounded by the second conductive layer inside each of the second through holes; and third conductive layers disposed on respective sides of the core substrate, the third conductive layers overlapping the first through holes and the second through holes in a plan view, and the third conductive layers being electrically connected to both the first conductive layer and the second conductive layer, wherein the second conductive layer overlaps the first through holes in the plan view, and wherein the first through holes and the second through holes are alternately arranged in a row.

3. A waveguide substrate comprising:

a core substrate through which first through holes and second through holes are formed;

a first conductive layer covering an inner wall surface of each of the first through holes and covering both sides of the core substrate;

a second conductive layer covering an inner wall surface of each of the second through holes and covering both sides of the core substrate;

a first filler material filling a space surrounded by the first conductive layer inside each of the first through holes;

a second filler material filling a space surrounded by the second conductive layer inside each of the second through holes; and third conductive layers disposed on respective sides of the core substrate, the third conductive layers overlapping the first through holes and the second through holes in a plan view, and the third conductive layers being electrically connected to both the first conductive layer and the second conductive layer, wherein the second conductive layer overlaps the first through holes in the plan view, and wherein a width of each of the first through holes is different from a width of each of the second through holes.

4. The waveguide substrate as claimed in claim 1, further comprising:

a fourth conductive layer covering an inner wall surface of each of a plurality of third through holes formed through the core substrate and covering both the upper and lower surfaces of the core substrate; and a third filler material filling a space surrounded by the fourth conductive layer inside each of the third through holes, wherein the third conductive layers overlap the third through holes in the plan view, and are electrically connected to the fourth conductive layer, and wherein the fourth conductive layer overlaps the first conductive layer and the second conductive layer in the plan view.

5. The waveguide substrate as claimed in claim 4, wherein one of the third through holes is situated between one of the first through holes and one of the second through holes adjacent to each other.

6. The waveguide substrate as claimed in claim 1, wherein the first through holes and the second through holes are alternately arranged in a row.

7. The waveguide substrate as claimed in claim 1, wherein a width of each of the first through holes is different from a width of each of the second through holes.

* * * * *